United States Patent
Yokoi et al.

(10) Patent No.: US 8,240,838 B2
(45) Date of Patent: Aug. 14, 2012

(54) INK COMPOSITION FOR INKJET RECORDING, INKJET RECORDING METHOD, AND PRINTED MATERIAL

(75) Inventors: Kazuhiro Yokoi, Kanagawa (JP); Taiji Katsumata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 899 days.

(21) Appl. No.: 12/292,483

(22) Filed: Nov. 20, 2008

(65) Prior Publication Data

US 2009/0142507 A1    Jun. 4, 2009

(30) Foreign Application Priority Data

Nov. 29, 2007 (JP) ................................. 2007-309205
Jun. 16, 2008 (JP) ................................. 2008-156287

(51) Int. Cl.
*B41J 2/01* (2006.01)

(52) U.S. Cl. ......... 347/102; 106/31.13; 347/1; 347/100; 427/458; 427/466; 427/487; 427/490; 427/493; 427/508

(58) Field of Classification Search ............... 106/31.13; 347/1, 100, 102; 50/56; 427/458, 466, 487, 427/490, 493, 508

See application file for complete search history.

(56) References Cited

U.S. PATENT DOCUMENTS

| | | | | |
|---|---|---|---|---|
| 5,912,280 A | * | 6/1999 | Anton et al. | 523/161 |
| 5,932,632 A | * | 8/1999 | Biensan et al. | 523/161 |
| 2008/0103280 A1 | * | 5/2008 | Satou et al. | 528/26 |
| 2008/0250973 A1 | * | 10/2008 | Leenders et al. | 106/31.92 |
| 2010/0098878 A1 | * | 4/2010 | Tsubaki | 427/552 |

FOREIGN PATENT DOCUMENTS

| | | | |
|---|---|---|---|
| EP | 1762599 A1 | | 3/2007 |
| JP | 2006182970 | * | 7/2006 |
| JP | A 2006-182970 | | 7/2006 |
| WO | 2007/045578 A1 | | 4/2007 |

OTHER PUBLICATIONS

Bruce M. Monroe et. al., Chemical Reviews, vol. 93, (1993), pp. 435-448.

* cited by examiner

*Primary Examiner* — Charles Boyer

(74) *Attorney, Agent, or Firm* — SOLARIS Intellectual Property Group, PLLC

(57) ABSTRACT

An ink composition for inkjet recording is provided. The ink composition contains (a) a monomer containing a fluorinated alkylene group and two or more polymerizable groups, (b) a photo initiator, and (c) a polymerizable monomer.

8 Claims, 2 Drawing Sheets

INK COMPOSITION FOR INKJET RECORDING, INKJET RECORDING METHOD, AND PRINTED MATERIAL

CROSS-REFERENCE TO RELATED APPLICATION

This application claims priority under 35 USC 119 from Japanese Patent Application Nos. 2007-309205 and 2008-156287, the disclosures of which are incorporated by reference herein.

BACKGROUND OF THE INVENTION

1. Field of the Invention

The present invention relates to an ink composition favorably used for inkjet recording, an inkjet recording method, and a printed material produced therewith.

2. Description of the Related Art

There are various image-recording methods for forming an image on a recording medium such as paper based on an image data signal, including electrophotographic methods, sublimation process or melting process thermal transfer methods, inkjet methods, and the like. An electrophotographic method requires a process for forming an electrostatic latent image on a photoreceptor drum through electrification and exposure, and is problematic since, for example, it requires a complex system, resulting in high production costs. In a thermal transfer method, although the apparatus is inexpensive, there are problems such as high running costs and generation of waste material since an ink ribbon is used. In contrast, an inkjet method employs an inexpensive apparatus, and ink is ejected only to required image portions to directly form an image on a recording medium. Therefore, it is possible to effectively use the ink, thereby reducing running costs. Further, an inkjet method is less noisy. Accordingly, an inkjet method is an excellent image recording method.

In the case of inks for inkjet recording that are curable by the irradiation of radiation such as ultraviolet rays (radiation-curable type ink for inkjet recording), it is necessary to provide sufficiently high sensitivity and high image quality. High sensitivity provides the ink with high curability with respect to radiation, resulting in many advantages such as reduced electric power consumption, elongation of service life due to diminished load on a radiation generator, and prevention of the generation of low molecular weight materials caused by insufficient curing.

Ultraviolet ray-curable type inkjet methods have come under scrutiny in recent years due to the advantages of relatively low odor generation, quick drying property, and the possibility of recording on a recording medium having no ink absorption property. In particular, benzyl, benzoin, benzoin ethyl ether, Michler's ketone, anthraquinone, acridine, phenazine, benzophenone, 2-ethylanthraquinone or the like have been generally used as a photopolymerization initiator, (see, for example, Bruce M. Monroe et. al., Chemical Reviews, Vol. 93, (1993), pp. 435-448). However, when such photopolymerization initiators are used, since the curing sensitivity of a photopolymerizable composition is low, a long period of time is required for the image exposure in image formation. Consequently, if slight shaking exists in the operation, for fine images, an image having good image quality cannot be reproduced and, further, since the energy emission amount of a light source for the exposure must be increased, the irradiation of a large amount of generated heat associated therewith must be taken into consideration.

JP-A No. 2006-182970 proposes an ink composition for inkjet recording and the ink composition of JP-A. 2006-182970 contains a polymerizable compound, a colorant, and a hydrophobic polymer such as a fluorine group-containing polymer, for the purpose of providing an ink for inkjet recording that has high curing sensitivity and provides an image having favorable image quality. However, the ink composition for inkjet recording as described in the JP-A No. 2006-182970 is problematic in that the viscosity is high because the ink contains a polymer component.

SUMMARY OF THE INVENTION

The present invention has been made in view of the above circumstances and provides an ink composition for ink jet recording, an inkjet recording method, and a printed material.

According to a first aspect of the invention, an ink composition for inkjet recording is provided. The ink composition includes: a monomer containing a fluorinated alkylene group and two or more polymerizable groups, a photo initiator, and a polymerizable monomer.

According to a second aspect of the invention, an inkjet recording method is provided. The inkjet recording method includes: ejecting the ink composition for inkjet recording of the first aspect of the invention onto a recording medium using an inkjet recording apparatus; and irradiating the ejected ink composition with active radiation to cure the ink composition for inkjet recording.

According to a third aspect of the invention, a printed material recorded by the inkjet recording method of the second aspect of the invention is provided.

DETAILED DESCRIPTION OF THE INVENTION

[Ink Composition for Inkjet Recording]

Figure 1B:
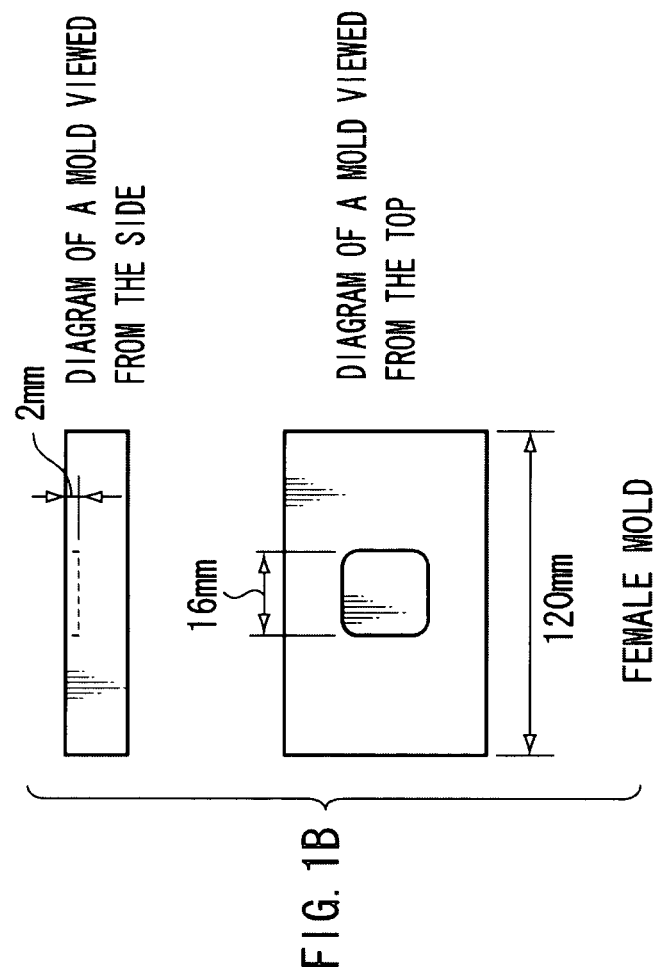
FIG. 1B is a side view and top view each illustrating the mold used in the embossing test in the Examples.

The ink composition for inkjet recording of the present invention (hereinafter, it is also referred to as the "ink composition" simply) includes (a) a monomer containing a fluorinated alkylene group and two or more polymerizable groups in the molecule (hereinafter, it is occasionally referred to as the "fluorine-containing polyfunctional monomer"), (b) a photo initiator, and (c) a polymerizable monomer.

By using the ink composition of the invention, it is possible to form an image excellent in abrasion resistance, antiblocking property and flexibility. In addition, since the viscosity of the ink composition can be decreased, ejection property by an inkjet recording apparatus is good.

The ink composition of the invention can be cured by the irradiation of active radiation.

The "active radiation" in the invention is not particularly limited as long as it can apply energy capable of generating an initiating species in the ink composition by the irradiation thereof, and widely includes $\alpha$-rays, $\gamma$-rays, X-rays, ultraviolet rays, visible rays, electron beams, and the like. Among these, in view of the curing sensitivity and easy availability of an apparatus, ultraviolet rays and electron beams are preferable, and ultraviolet rays are particularly preferable. Accordingly, for the ink composition of the invention, an ink composition curable by the irradiation of ultraviolet rays as the active radiation (hereinafter, it is simply referred to as "radiation") is preferable.

Hereinafter, respective components for use in the ink composition of the invention will be described.

<(a) Fluorine-Containing Polyfunctional Monomer>

The fluorine-containing polyfunctional monomer is a monomer containing two or more polymerizable groups and a fluorinated alkylene group in the molecule thereof Specifically, it is particularly preferably at least one monomer selected from the group consisting of (a1) a monomer containing a chain structure containing a fluorinated alkylene group, and two or more polymerizable groups respectively provided at two or more terminals of the chain structure in the molecule, and (a2) a monomer containing a ring structure having two or more chain-shaped substituents and containing a fluorinated alkylene group, and two or more polymerizable groups respectively provided at a terminal of two or more chain-shaped substituents of the two or more chain-shaped substituents in the molecule.

Since the fluorine-containing polyfunctional monomer contains fluorine and has hydrophobicity, when the ink composition is deposited onto the recording medium surface, the fluorine-containing polyfunctional monomer is located near the surface of an ink drop and cured. In addition, since it contains plural polymerizable groups, it enables the image surface to be cured more solidly. Further, since the polymerizable monomer is located at relatively inner position of the ink drop when the ink composition is deposited onto the recording medium surface, there is no necessity to use a polyfunctional monomer containing plural polymerizable groups in the molecule in a large amount, as a polymerizable monomer. Consequently, maintaining the flexibility of an image as a whole is easy. In addition, since the fluorine-containing polyfunctional monomer has a low molecular weight, preventing the increase in viscosity of the ink composition is made easier as compared with the case when a fluorine-containing polymer is used.

Main Chain Skeleton

Here, when the main chain skeleton of the fluorine-containing polyfunctional monomer has a chain structure, the chain structure may be of a straight or branched chain. When the chain structure is of a straight chain, polymerizable groups are provided at both terminals. When the chain structure is of a branched chain, since three or more terminal portions exist in a molecule, the number of the polymerizable groups contained in the molecule can be selected in the range from 2 to the number of the terminal portions.

On the other hand, when the main chain skeleton is of a ring structure, it may have any of a monocyclic structure, a condensed ring structure in which two or more rings are bonded so as to share one or more atoms contained in the skeleton of respective rings, and a polycyclic structure in which two or more rings are bonded via a single bond or a divalent linking group.

Examples of the divalent linking groups include —O—, —O—C=O—, an alkylene group having 1 to 20 carbon atoms, and an alkyleneoxy group having 2 to 12 carbon atoms.

The chain-shaped substituent bonded to the ring structure is provided as follows. That is, when the ring structure is a monocyclic structure, two or more chain-shaped substituents are provided on one ring, and, when the ring structure is a condensed ring structure or a polycyclic structure, one or more chain-shaped substituents are provided on at least either one ring and two or more chain-shaped substituents are provided in the whole molecule. Then, the polymerizable group is provided at the terminal of at least two or more chain-shaped substituents among the two or more chain-shaped substituents contained in the molecule. The ring structure is preferably a three- to ten-membered ring structure, more preferably a five- to eight-membered ring structure.

The fluorinated alkylene group contained in the main chain skeleton is one having a structure in which at least a part of hydrogen atoms contained in an alkylene group is substituted with a fluorine atom. Here, the substitution ratio of hydrogen atoms contained in an alkylene group to fluorine atoms is preferably in the range of 30% to 100%, more preferably 50% to 100%, within the whole molecule. When the substitution ratio is 30% or more, it is possible to easily assure the hydrophobicity as the whole molecule, preferably. In the fluorinated alkylene group, a part of carbon atoms contained in the group may be substituted with a hetero atom (—O—, —N—, —S—). On this occasion, —O— is preferable among these hetero atoms.

Further, the hydrogen atom and/or fluorine atom contained in a fluorinated alkylene group may be substituted with a chain-shaped substituent.

For the chain-shaped substituent, the number of carbon atoms of the chain-shaped substituent is, when the main chain skeleton has a chain structure, preferably 1 to 8, more preferably 1 to 4. Favorable specific examples thereof can include —$CF_3$, —$C_2F_5$, and —$C_2H_4CF_3$.

When the main chain skeleton is in a ring structure, the number of carbon atoms of the chain-shaped substituent is preferably 1 to 8, more preferably 1 to 4, wherein the terminal of the chain-shaped substituent may contain a polymerizable group. Favorable specific examples thereof can include —$CH_2O$—X, and —$CH_2OC$=O—X (where X means a polymerizable group).

The number of polymerizable groups contained in the molecule is two or more. More preferably, it is three or more. The upper limit of the number of polymerizable groups contained in the molecule is not particularly limited, but the number of polymerizable group is preferably 8 or less, more preferably 6 or less. The polymerizable group may be either radically polymerizable or cationically polymerizable.

By setting the number of the polymerizable groups contained in the molecule to two or more, the abrasion resistance of an image surface can be assured. On the other hand, setting the number of the polymerizable groups contained in the molecule eight or less is preferable from the viewpoint of easy availability, and giving flexibility and storage stability.

A cationically polymerizable group is preferably a vinyl ether group or a cyclic ether group. A radically polymerizable group is preferably a polymerizable group having an ethylenically unsaturated bond capable of radical polymerization. Hereinafter, cationically polymerizable groups and radically polymerizable groups will be described in detail.

Cationically Polymerizable Group

Examples of the cationically polymerizable group include substituents having a cyclic ether group, such as an epoxy group, an oxetane group, and an oxolane group.

When the polymerizable group is a cyclic ether group, it is preferably a cyclic ether group having 2 to 6 carbon atoms, and more preferably a cyclic ether group having 2 to 3 carbon atoms. Further, the cyclic ether group may be a monocyclic ring or polycyclic ring. Among these, an epoxy group is particularly preferable. From the viewpoint of cationic polymerizability, a cyclic ether group shown below is particularly preferred as a cyclic ether group.

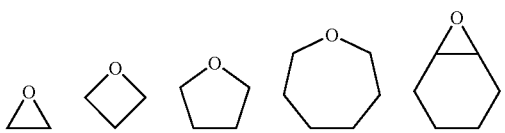

To a carbon atom contained in a cyclic ether group, a substituent may have been introduced. Examples of substituents which may be introduced include alkyl groups having 1 to 18 carbon atoms, cycloalkyl groups having 3 to 12 carbon atoms, aryl groups having 6 to 14 carbon atoms, alkoxy groups having 1 to 18 carbon atoms, aryloxy groups having 6 to 10 carbon atoms, alkylamino groups having 1 to 18 carbon atoms and arylamino groups having 6 to 10 carbon atoms.

Radically Polymerizable Group

Examples of the radically polymerizable group include polymerizable groups having a radically-polymerizable ethylenically-unsaturated bond, which may be any substituents having at least one radically-polymerizable ethylenically-unsaturated bond in the polymer. Examples of such polymerizable groups having a radically-polymerizable ethylenically-unsaturated bond include radically polymerizable groups such as unsaturated carboxylic acid ester groups, e.g. an acrylic acid ester group, a methacrylic acid ester group, an itaconic acid ester group, a crotonic acid ester group, an isocrotonic acid ester group and a maleic acid ester group, and styrene group. In particular, a methacrylic acid ester group and an acrylic acid ester group are preferred.

The molecular weight of the fluorine-containing polyfunctional monomer is not particularly limited, but may be in the range of preferably 300 to 2000, more preferably 300 to 1500. When the molecular weight is 300 or more, it is possible to suppress the volatilization from the ink, and when the molecular weight is 2000 or less, it is possible to keep the viscosity of the ink composition lower, as compared with that when a fluorine-containing polymer is used.

In an embodiment, the fluorine-containing polyfunctional monomer may be a compound having any of formulae (1) to (3) below. Here, in formulae (1) to (3), $L^1$, $L^2$ and $L^c$ represent a fluorinated alkylene group, X represents a polymerizable group, B represents a branched group having three or more bonding hands, -A-X represents a chain-shaped substituent containing a polymerizable group (where X represents a polymerizable group and A represents a divalent straight chain-shaped linking group). n1 means an integer of three or more, and n2 essentially means an integer of two or more.

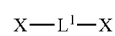   Formula (1)

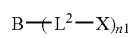   Formula (2)

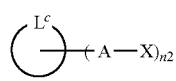   Formula (3)

Here, formula (1) shows a fluorine-containing polyfunctional monomer which contains a fluorinated alkylene group as a straight chain-shaped main chain skeleton and two polymerizable groups provided at both terminals of the straight chain-shaped main chain skeleton.

Meanwhile, the chain length of the fluorinated alkylene group $L^1$ is preferably 4 to 20, more preferably 6 to 15, in terms of the number of carbon atoms (the number of carbon atoms means a value, when a carbon atom is substituted with a hetero atom, obtained by counting the hetero atom as a carbon atom).

Formula (2) shows a fluorine-containing polyfunctional monomer, in which three or more fluorinated alkylene groups provided with a polymerizable group at the terminal are bonded to a branched group having three or more bonding hands.

The structure of the branched groups having three or more bonding hands is not particularly limited, and examples thereof include (1) one having three bonding hands such as a nitrogen atom, and ≡C—$R^1$; (2) one having four bonding hands such as a carbon atom (quaternary carbon), and =$CR^{21}$—$R^3$—$CR^{22}$=; and (3) one having six bonding hands such as ≡C—$R^4$—C≡.

Here, $R^1$ means a hydrogen atom, a fluorine atom, or a monovalent substituent having 1 to 6 carbon atoms and containing no polymerizable group at the terminal (for example, —$CF_3$, or —$CH_3$). $R^{21}$ and $R^{22}$ each independently mean a hydrogen atom, a fluorine atom, or a monovalent substituent having 1 to 6 carbon atoms and containing no polymerizable group at the terminal (for example, —$CH_3$ or —$CF_3$). $R^3$ and $R^4$ each independently mean —O— or a divalent linking group having 1 to 6 carbon atoms (for example, —$CF_2$—O—$CF_2$— or —COO—).

The branched groups as exemplified above only include ones having three, four or six bonding hands, but it is also possible to provide additional one or more bonding hands by removing a hydrogen atom or a fluorine atom contained in a substituent or a linking group.

The chain length of the fluorinated alkylene group $L^2$ is preferably 4 to 20, more preferably 6 to 15 in terms of the number of carbon atoms (the number of carbon atoms means a value, when a carbon atom is substituted with a hetero atom, obtained by counting the hetero atom as a carbon atom).

Formula (3) shows a fluorine-containing polyfunctional monomer that contains a fluorinated alkylene group forming a cyclic skeleton, and a chain-shaped substituent having a polymerizable group at the terminal as the substituent of the ring. In formula (3), A means a divalent straight chain-shaped linking group having 1 to 20 carbon atoms, and examples thereof include —$CH_2O$— and —$CF_2O$—.

Formula (3) shows a monocyclic structure, and there are modified examples of formula (3) such as a condensed ring structure and a polycyclic structure. On this occasion, n2 may be 2 or more in the whole molecule, and may be 0 or 1 in any one of the rings.

Specific examples of fluorine-containing polyfunctional monomers include monomers represented by formulae A-1 to A-10 below, but the invention is not limited only to the monomers represented by more specific formulae A-1 to A-10.

Meanwhile, examples of monomers corresponding to specific examples of formula (1) include formulae A-5 and A-6; examples of monomers corresponding to specific examples of formula (2) include formulae A-1, A-2, A-3, A-8, and A-9; examples of monomers corresponding to specific examples of formula (3) include formulae A-4 and A-10; and examples of monomers corresponding to modified examples (condensed ring structure) of formula (3) include formula A-7.

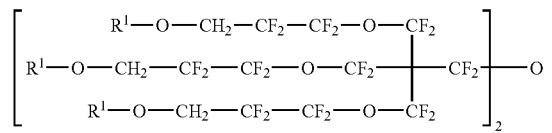
A-1

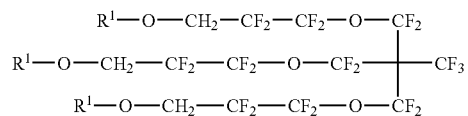
A-2

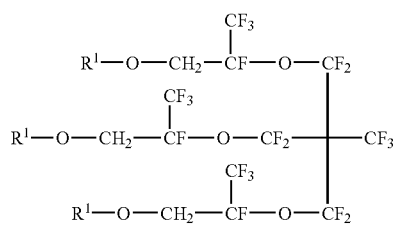
A-3

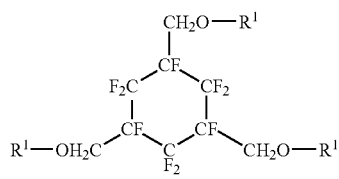
A-4

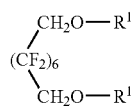
A-5

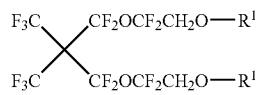
A-6

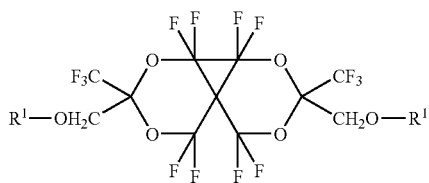
A-7

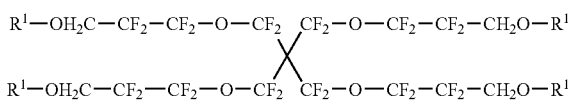
A-8

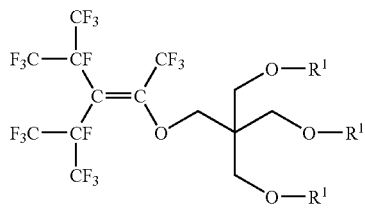
A-9

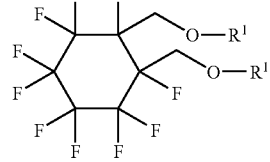
A-10

$R^1$ in formulae A-1 to A-10 represents $CH_2$=CH—(C=O)—, $CH_3$—CH=CH—(C=O)—, $CH_2$=CH—O—, a glycidyl group, an oxetanyl group, or a vinyl group.

To the ink composition of the invention, only one (a) fluorine-containing polyfunctional monomer may be added, or two or more (a) fluorine-containing polyfunctional monomers may be used in combination.

The content of (a) the fluorine-containing polyfunctional monomer(s) is preferably 0.1 to 30 mass %, more preferably 0.5 to 20 mass %, and even more preferably 0.5 to 15 mass %, relative to the total solid content of the ink composition.

The content of 0.1 mass % or more is preferable because an image having excellent abrasion resistance and antiblocking property can more easily be formed, and the content of 30 mass % or less is preferable because an image having an excellent flexibility can more easily be formed.

The ratio of (a) the fluorine-containing polyfunctional monomer to (b) the photo initiator may be in the range of 0.001 to 0.5, preferably 0.005 to 0.2 in the (a)/(b) molar ratio, from the viewpoint of keeping high sensitivity and giving stability.

The method for synthesizing the fluorine-containing polyfunctional monomer is not particularly limited. The monomer can be synthesized according to publicly known common synthetic methods.

<(b) Polymerizable Monomer>

The ink composition of the invention inevitably contains a polymerizable monomer such as a cationically polymerizable compound or a radically polymerizable compound.

Cationic Polymerizable Compound

As the cationic polymerizable compound, a compound that may initiate polymerization reaction by an acid generated by a compound which generates the acid by the irradiation of radiation, and be cured, may be preferably used, and various well-known cationic polymerizable monomers that have been known as a photo cationic polymerizable monomer may be used. Examples of the cationic polymerizable monomer include the epoxy compounds, the vinylether compounds, and the oxetane compounds described in, for example, Japanese Patent Application Laid-open (JP-A) Nos. H06-9714, 2001-31892, 2001-40068, 2001-55507, 2001-310938, 2001-310937, and 2001-220526.

The epoxy compounds include aromatic epoxides, alicyclic epoxides, and the like.

The aromatic epoxides are, for example, di- or poly-glycidyl ethers prepared in reaction of a polyvalent phenol having at least one aromatic ring or the alkyleneoxide adduct thereof with epichlorohydrin, and example thereof include di- or poly-glycidyl ethers of bisphenol A or the alkyleneoxide adduct thereof, di- or poly-glycidyl ethers of a hydrogenated bisphenol A or the alkyleneoxide adduct thereof, novolak epoxy resins, and the like. The alkyleneoxide may be ethyleneoxide, propyleneoxide, or the like.

Preferable examples of the alicyclic epoxides include compounds containing cyclohexene oxide or cyclopentene oxide prepared through epoxidation of a compound having at least one cycloalkane ring such as a cyclohexene or cyclopentene ring with an appropriate oxidant such as hydrogen peroxide or peroxy acid.

Examples of the aliphatic epoxide include diglycidyl or polyglycidyl ethers of aliphatic polyhydric alcohols or alkylene oxide adducts thereof, and typical examples thereof include diglycidyl ethers of alkylene glycols such as diglycidyl ether of ethylene glycol, diglycidyl ether of propylene glycol, and diglycidyl ether of 1,6-hexanediol, polyglycidyl ethers of polyhydric alcohols such as diglycidyl or triglycidyl ether of glycerol or alkylene oxide adducts thereof, diglycidyl ethers of polyalkylene glycols such as diglycidyl ether of polyethylene glycol or alkylene oxide adducts thereof, and diglycidyl ether of polypropylene glycol or alkylene oxide adducts thereof Examples of the alkylene oxide include ethylene oxide and propylene oxide.

The monofunctional and polyfunctional epoxy compounds for use in the invention will be described in detail below.

Examples of the monofunctional epoxy compounds include phenyl glycidylether, p-tert-butylphenyl glycidylether, butyl glycidylether, 2-ethylhexyl glycidylether, allyl glycidylether, 1,2-butyleneoxide, 1,3-butadienemonooxide, 1,2-epoxydodecane, epichlorohydrin, 1,2-epoxydecane, styreneoxide, cylcohexeneoxide, 3-methacryloyloxymethylcylcohexeneoxide, 3-acryloyloxymethylcylcohexeneoxide, 3-vinylcylcohexeneoxide, and the like.

Examples of the multifunctional epoxy compounds include bisphenol A diglycidylether, bisphenol F diglycidylether, bisphenol S diglycidylether, brominated bisphenol A diglycidylether, brominated bisphenol F diglycidylethers, brominated bisphenol S diglycidylether, epoxy novolak resins, hydrogenated bisphenol A diglycidylethers, hydrogenated bisphenol F diglycidylethers, hydrogenated bisphenol S diglycidylethers, 3,4-epoxycyclohexylmethyl-3',4'-epoxycyclohexanecarboxylate, 2-(3,4-epoxycyclohexyl-5,5-spiro-3,4-epoxy)cyclohexane-meta-dioxane, bis(3,4-epoxycyclohexylmethyl)adipate, vinylcylcohexeneoxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexanecarboxylate, methylene-bis(3,4-epoxycyclohexane), dicyclopentadiene diepoxide, ethylene glycol di(3,4-epoxycyclohexylmethyl)ether, ethylene bis(3,4-epoxycyclohexanecarboxylate), epoxyhexahydrodioctyl phthalate, epoxyhexahydrodi-2-ethylhexyl phthalate, 1,4-butanediol diglycidylether, 1,6-hexanediol diglycidylether, glycerol triglycidylether, trimethylolpropane triglycidylether, polyethylene glycol diglycidylether, polypropylene glycol diglycidylether, 1,1,3-tetradecadienedioxide, limonenedioxide, 1,2,7,8-diepoxyoctane, 1,2,5,6-diepoxycyclooctane, and the like.

Among these epoxy compounds, aromatic and alicyclic epoxides are preferable from the viewpoint of curing speed, and alicyclic epoxides are particularly preferable.

Examples of the vinyl ether compounds include di- or tri-vinyl ether compounds such as ethylene glycol divinylether, diethylene glycol divinylether, triethylene glycol divinylether, propylene glycol divinylether, dipropylene glycol divinylether, butanediol divinylether, hexanediol divinylether, cyclohexanedimethanol divinylether, and trimethylolpropane trivinylether; monovinylether compounds such as ethyl vinylether, n-butyl vinylether, isobutyl vinylether, octadecyl vinylether, cyclohexyl vinylether, hydroxybutyl vinylether, 2-ethylhexyl vinylether, cyclohexanedimethanol monovinylether, n-propyl vinylether, isopropyl vinylether, isopropenylether-O-propylene carbonate, dodecyl vinylether, diethylene glycol monovinylether, and octadecyl vinylether; and the like.

Hereinafter, the monofunctional and multifunctional vinyl ethers will be described in detail.

Examples of the monofunctional vinylethers include methyl vinylether, ethyl vinylether, propyl vinylether, n-butyl vinylether, t-butyl vinylether, 2-ethylhexyl vinylether, n-nonyl vinylether, lauryl vinylether, cyclohexyl vinylether, cyclohexylmethyl vinylether, 4-methylcyclohexylmethyl vinylether, benzyl vinylether, dicyclopentenyl vinylether, 2-dicyclopentenoxyethyl vinylether, methoxyethyl vinylether, ethoxyethyl vinylether, butoxyethyl vinylether, methoxyethoxyethyl vinylether, ethoxyethoxyethyl vinylether, methoxypolyethylene glycol vinylether, tetrahydrofurfuryl vinylether, 2-hydroxyethyl vinylether, 2-hydroxypropyl vinylether, 4-hydroxybutyl vinylether, 4-hydroxymethylcyclohexylmethyl vinylether, diethylene glycol monovinylether, polyethylene glycol vinylether, chloroethyl vinylether, chlorobutyl vinylether, chloroethoxyethyl vinylether, phenylethyl vinylether, phenoxypolyethylene glycol vinylether, and the like.

Examples of the multifunctional vinylethers include divinyl ethers such as ethylene glycol divinylether, diethylene glycol divinylether, polyethylene glycol divinylether, propylene glycol divinylether, butylene glycol divinylether, hexanediol divinylether, bisphenol A alkyleneoxide divinylethers, and bisphenol F alkyleneoxide divinylethers; multifunctional vinyl ethers such as trimethylolethane trivinylether, trimethylolpropane trivinylether, ditrimethyrollpropane tetravinylether, glycerol trivinylether, pentaerythritol tetravinylether, dipentaerythritol pentavinylether, dipentaerythritol hexavinylether, ethyleneoxide adducts of trimethylolpropane trivinylether, propyleneoxide adducts of trimethylolpropane trivinylether, ethyleneoxide adducts of ditrimethyrollpropane tetravinylether, propyleneoxide adducts of ditrimethyrollpropane tetravinylether, ethyleneoxide adducts of pentaerythritol tetravinylether, propyleneoxide adducts of pentaerythritol tetravinyl ether, ethyleneoxide adducts of dipentaerythritol hexavinylether, and propyleneoxide adducts of dipentaerythritol hexavinylether, and the like.

Di- or tri-vinylether compounds are preferable as the vinyl ether compounds, form the viewpoints of curing efficiency, adhesiveness to recording medium, and the surface hardness of formed image; and divinylether compounds are particularly preferable.

The oxetane compounds which may be used in the invention may be arbitrarily selected from known oxetane compounds such as those described in JP-A Nos. 2001-220526, 2001-310937, and 2003-341217. In the invention, the compound having an oxetane ring is preferably a compound having 1 to 4 oxetane rings in the structure thereof. The use of the compound facilitates maintenance of the viscosity of the composition within a range which achieves favorable proccessability (handling), and, in cases where the composition is used as an ink composition, ensures high adhesiveness between the cured composition and a recording medium.

Examples of the compounds having one or two oxetane rings in the molecule that may be used in the invention include the compounds represented by the following formulae (1) to (3), and the like.

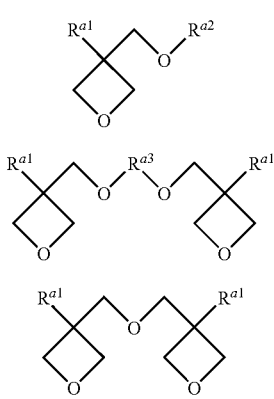

(1)

(2)

(3)

$R^{a1}$ represents a hydrogen atom, an alkyl group having 1 to 6 carbon atoms, a fluoroalkyl group having 1 to 6 carbon atoms, an allyl group, an aryl group, a furyl group, or a thienyl group. In cases where two $R^{a1}$s are present in the molecule, they may be the same or different from each other.

Examples of the alkyl group include a methyl group, an ethyl group, a propyl group, and a butyl group, and any of hydrogen atoms in these alkyl groups may be substituted with a fluorine atom, which are preferable as the fluoroalkyl group.

$R^{a2}$ represents a hydrogen atom, an alkyl group having 1 to 6 carbon atoms, an alkenyl group having 2 to 6 carbon atoms, an aromatic ring-containing group, an alkylcarbonyl group having 2 to 6 carbon atoms, an alkoxycarbonyl group having 2 to 6 carbon atoms, and an N-alkylcarbamoyl group having 2 to 6 carbon atoms. Examples of the alkyl group include a methyl group, an ethyl group, a propyl group, and a butyl group. Examples of the alkenyl group include a 1-propenyl group, a 2-propenyl group, a 2-methyl-1-propenyl group, a 2-methyl-2-propenyl group, a 1-butenyl group, a 2-butenyl group, and a 3-butenyl group. Examples of the aromatic ring-containing group include a phenyl group, a benzyl group, a fluorobenzyl group, a methoxybenzyl group, and a phenoxyethyl group. Examples of the alkylcarbonyl group include an ethylcarbonyl group, a propylcarbonyl group, and a butylcarbonyl group. Examples of the alkoxycarbonyl group include an ethoxycarbonyl group, a propoxycarbonyl group, and a butoxycarbonyl group. Examples of the N-alkylcarbamoyl group include an ethylcarbamoyl group, a propylcarbamoyl group, a butylcarbamoyl group, and a pentylcarbamoyl group. $R^{a2}$ may be optionally substituted, and examples of the substituent include an alkyl group having 1 to 6 carbon atoms, and a fluorine atom.

$R^{a3}$ represents a linear or branched alkylene group, a linear or branched unsaturated hydrocarbon group, a carbonyl group or a carbonyl group-containing alkylene group, a carboxyl group-containing alkylene group, a carbamoyl group-containing alkylene group, or a group shown below. Examples of the alkylene groups include ethylene, propylene, and butylene groups and the like; and examples of the poly(alkyleneoxy) groups include poly(ethyleneoxy) and poly(propyleneoxy) groups and the like. Examples of the unsaturated hydrocarbon groups include propenylene, methylpropenylene, and butenylene groups, and the like.

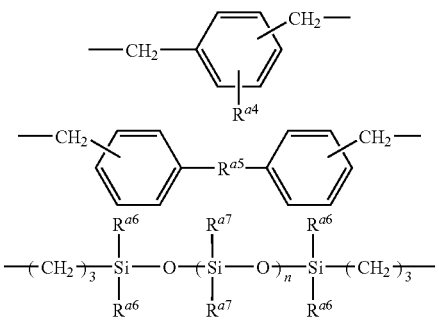

In cases where $R^{a3}$ is one of the above-described polyvalent groups, $R^{a4}$ represents a hydrogen atom, an alkyl group having 1 to 4 carbon atoms, an alkoxy group having 1 to 4 carbon atoms, a halogen atom, a nitro group, a cyano group, a mercapto group, a lower alkyl carboxyl group, a carboxyl group, or a carbamoyl group.

$R^{a5}$ represents an oxygen atom, a sulfur atom, a methylene group, NH, SO, $SO_2$, $C(CF_3)_2$, or $C(CH_3)_2$.

$R^{a6}$ represents an alkyl group having 1 to 4 carbon atoms, or an aryl group, and n is an integer of 0 to 2,000. $R^{a7}$ represents an alkyl group having 1 to 4 carbon atoms, an aryl group, or a monovalent group having the structure shown below. In the following formula, $R^{a8}$ represents an alkyl group having 1 to 4 carbon atoms or an aryl group, and m is an integer of 0 to 100.

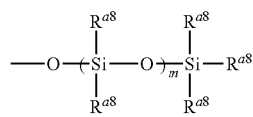

Examples of the compounds represented by the formula (1) include 3-ethyl-3-hydroxymethyloxetane (OXT-101: manufactured by Toagosei Co., Ltd.), 3-ethyl-3-(2-ethylhexyloxymethyl)oxetane (OXT-212: manufactured by Toagosei Co., Ltd.), and 3-ethyl-3-phenoxymethyloxetane (OXT-211: manufactured by Toagosei Co., Ltd.). Examples of the compounds represented by the formula (2) include 1,4-bis[(3-ethyl-3-oxetanylmethoxy)methyl)benzene (OXT-121: Toagosei Co., Ltd. In addition, examples of the compounds represented by the formula (3) include bis(3-ethyl-3-oxetanylmethyl)ether (OXT-221: Toagosei Co., Ltd.).

Examples of the compounds having 3 or 4 oxetane rings include the compounds represented by the following formula (4).

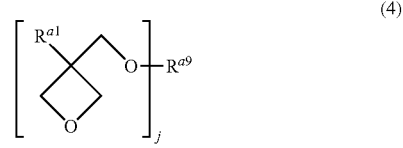

(4)

In formula (4), $R^{a1}$ is the same as that in formula (1) above. Examples of the polyvalent connecting group $R^{a9}$ include branched alkylene group having 1 to 12 carbon atoms such as the groups represented by the following groups A to C, branched poly(alkyleneoxy) groups such as the groups represented by the following group D, and branched polysiloxy groups such as the group represented by the following group E, and the like. j is 3 or 4.

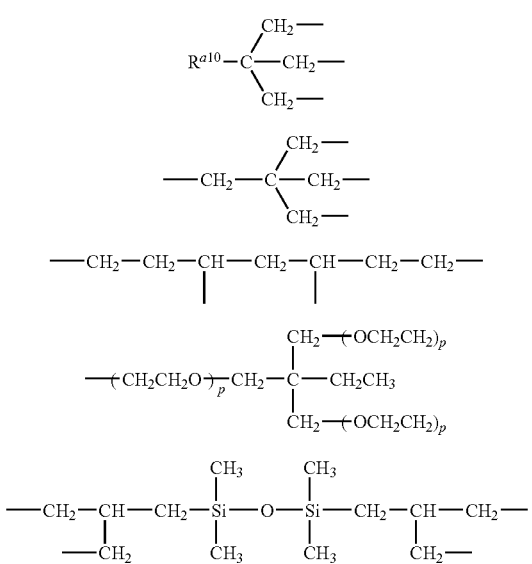

In group A, $R^{a10}$ represents a methyl, ethyl or propyl group. In group D, p is an integer of 1 to 10.

Other examples of the oxetane compounds favorably used in the invention include compounds represented by the following formula (5) having oxetane rings on the side chains.

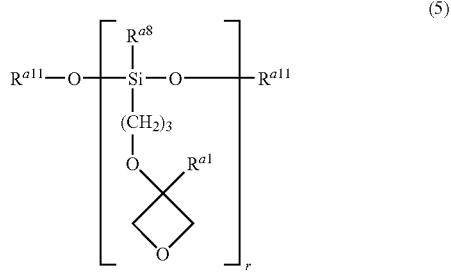

(5)

In formula (5), $R^{a1}$ is the same as that in formula (1), and $R^{a8}$ is the same as that in the above formula. $R^{a11}$ represents an alkyl group having 1 to 4 carbon atoms or a trialkylsilyl group such as a methyl group, an ethyl group, a propyl group, or a butyl group, and r is an integer of 1 to 4.

The compounds having an oxetane ring are described in detail in JP-A No. 2003-341217, paragraphs (0021) to (0084), and these compounds are favorably used in the invention.

The oxetane compound described in JP-A No. 2004-91556 may be used in combination in the invention. The compound is described in detail in JP-A No. 2004-91556, paragraphs (0022) to (0058).

In case where the cationic polymerizable compound is used in the ink composition of the present invention, the cationic polymerizable compound is preferably contained in an amount of 60 mass % or more with respect to the total solid content of the ink composition, and more preferably 70 mass % or more. The upper limit of the content of the cationic polymerizable compound is preferably 95 mass % or less.

Among the cationic polymerizable compounds, containing a cationic polymerizable monofunctional monomer in a range of 50 mass % or is preferable, and 60 mass % or more is more preferable. By containing the cationic polymerizable monofunctional monomer in the above range, the effect of improving the flexibility of cured layer may be exhibited.

Radical Polymerizable Compound

The radical polymerizable compound which may be used in the ink composition of the invention may be any compound as long as it is a compound which has a radically-polymerizable ethylenically-unsaturated bond and also has at least one radically polymerizable ethylenically unsaturated bond in the molecule. The chemical form of the compound may be a monomer, oligomer, polymer, or the like. Only one radical polymerizable compound may be used, or alternatively two or more radical polymerizable compounds may be used in an arbitrary ratio for the improvement of the target properties. Use of two or more compounds in combination is preferable in view of the control of the reactivity and properties such as physical properties.

Examples of the compounds having a radically-polymerizable ethylenically-unsaturated bond include radical polymerizable compounds such as; unsaturated carboxylic acids such as acrylic acid, methacrylic acid, itaconic acid, crotonic acid, isocrotonic acid and maleic acid and salts thereof, anhydrides having an ethylenically unsaturated group, acrylonitorile, styrene, various types of unsaturated polyesters, unsaturated polyethers, unsaturated polyamides, and unsaturated urethanes.

Specific examples include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentylglycol diacrylate, 1,6-hexanediol diacrylate, ethyleneglycol diacrylate, diethyleneglycol diacrylate, triethyleneglycol diacrylate, tetraethyleneglycol diacrylate, polyethyleneglycol diacrylate, polypropyleneglycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide and epoxyacrylate; methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethyleneglycol dimethacrylate, triethyleneglycoldimethacrylate, polyethyleneglycol dimethacrylate, polypropyleneglycol dimethacrylate, trimethylolethane trimethacrylate, trimethylolpropane trimethacrylate, and 2,2-bis(4-methacryloxypolyethoxyphenyl)propane; and allyl compound derivatives such as allyl glycidyl ether, diallyl phthalate and triallyl trimellitate. Further specifically, commercially available or well known in the industry, radically polymerizable or crosslinkable monomers, oligomers and polymers described in "Crosslinking Agent Handbook" edited by Shinzo Yamashita (1981, Taiseisha); "UV•EB Curing Handbook (ingredient part)" edited by Kiyoshi Kato (1985, Koubunshikankoukai); P. 79 in "Application and Market of UV•EB curing technique" edited by RadTech Japan (1989, CMC); "Polyester Resin Handbook" written by Eiichiro Takiyama (1988, The Nikkan Kogyo Shinbun, Ltd.) or the like, may be used.

Examples of known radical polymerizable compounds include photocurable type polymerizable compounds used for the photopolymerizable compositions described in JP-A No. 7-159983, JP-B No. 7-31399 and JP-A Nos. 8-224982, 10-863, and 9-134011. These may be applied to the ink composition of the invention.

Use of a vinyl ether compound as the radical polymerizable compound is also preferred. Examples of vinyl ether compounds favorably used include di- or trivinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexanedimethanol divinyl ether, hydroxyethyl monovinyl ether, hydroxynonyl monovinyl ether and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-O-propylene carbonate, dodecyl vinyl ether, diethylene glycol monovinyl ether and octadecyl vinyl ether.

Among such vinyl ether compounds, divinyl ether compounds and trivinyl ether compounds are preferred, and divinyl ether compounds are particularly preferred from the viewpoint of curability, adhesiveness and surface hardness. Vinyl ether compounds may be used either singly or in combination of two or more species thereof selected at will.

In case where the radical polymerizable compound is used in the ink composition of the present invention, the radical polymerizable compound(s) may be preferably contained in an amount of 60 mass % or more with respect to the total solid content of the ink composition, and more preferably 70 mass % or more. The upper limit of the content of the radical polymerizable compound is preferably 95 mass % or less. Among the radical polymerizable compounds, containing a radical polymerizable monofunctional monomer in a range of 50 mass % or is preferable, and 60 mass % or more is more preferable. By containing the radical polymerizable monofunctional monomer in the above range, the effect of further improving the flexibility of cured layer may be exhibited.

<(c) Photo Initiator>

The ink composition of the invention contains a photo initiator, and preferably contains a compound which generates an acid by irradiation with a radiation as the initiator. In the invention, the acid generated by irradiation with a radiation induces the above-described polymerizable compound to polymerize to cure.

The photo initiator usable in the ink composition of the invention may be selected properly from photo initiators for photocationic polymerization, photo initiators for photoradical polymerization, photo-erasing agent for dyes, photo discoloring agents, and compounds generating an acid by irradiation with light used for microresist or the like (for example, ultraviolet light of 400 to 200 nm, far ultraviolet light, most preferably g rays, h rays, i rays, or KrF excimer laser light), ArF excimer laser light, electron beams, X rays, molecular beams, or ion beams.

Examples of the photo initiators include onium salt compounds such as diazonium salts, phosphonium salts, sulfonium salts and iodonium salts and sulfonate compounds such as imidosulfonates, oxime sulfonates, diazodisulfones, disulfones, and o-nitrobenzyl sulfonates that decompose and generate acid by irradiation with radiation ray, and the like.

Examples of the other compounds (photo initiators) which generates an acid by irradiation with activated light or a radiation ray used in the invention include: diazonium salts described in S. I. Schlesinger, Photogr. Sci. Eng., 18, 387 (1974), T. S. Bal et al, Polymer, 21, 423 (1980), and others; ammonium salts described in U.S. Pat. Nos. 4,069,055, 4,069,056, and Re27,992, JP-A No. 3-140109, and others; phosphonium salts described in D. C. Necker et al, Macromolecules, 17, 2468 (1984), C. S. Wen et al, Teh, Proc. Conf. Rad. Curing ASIA, p. 478, Tokyo, October (1988), U.S. Pat. Nos. 4,069,055 and 4,069,056, and others; iodonium salts described in J. V. Crivello et al, Macromolecules, 10 (6), 1307 (1977), Chem. & Eng. News, Nov. 28, p. 31 (1988), European Patent Application Nos. 104,143, 339,049, and 410,201, JP-A Nos. 2-150848 and 2-296514, and others;

sulfonium salts described in J. V. Crivello et al, Polymer J. 17, 73 (1985), J. V. Crivello et al. J. Org. Chem., 43, 3055 (1978), W. R. Watt et al, J. Polymer Sci, Polymer Chem. Ed., 22, 1789 (1984), J. V. Crivello et al, Polymer Bull., 14, 279 (1985), J. V. Crivello et al, Macromolecules, 14 (5), 1141 (1981), J. V. Crivello et al, J. Polymer Sci., Polymer Chem. Ed., 17, 2877 (1979), European Patent Nos. 370,693, 161, 811, 410,201, 339,049, 233,567, 297,443, and 297,442, U.S. Pat. Nos. 3,902,114, 4,933,377, 4,760,013, 4,734,444, and 2,833,827, German Patent Nos. 2,904,626, 3,604,580, and 3,604,581, JP-A Nos. 7-28237, and 8-27102, and others;

selenonium salts described in J. V. Crivello et al, Macromolecules, 10 (6), 1307 (1977), J. V. Crivello et al, J. Polymer Sci., Polymer Chem. Ed., 17, 1047 (1979), and others; onium salts such as arsonium salts described in C. S. Wen et al, Teh, Proc. Conf. Rad. Curing ASIA, p478, Tokyo, October (1988); organic halogen compounds described in U.S. Pat. No. 3,905, 815, Japanese Patent Application Publication (JP-B) No. 46-4605, JP-A Nos. 48-36281, 55-32070, 60-239736, 61-169835, 61-169837, 62-58241, 62-212401, 63-70243, and 63-298339, and others; organic metals/organic halides described in K. Meier et al, J. Rad. Curing, 13 (4), 26 (1986), T. P. Gill et al, Inorg. Chem., 19, 3007 (1980), D. Astruc, Acc. Chem. Res., 19 (12), 377 (1986), JP-A No. 2-161445, and others;

photo initiators having an o-nitrobenzyl type protecting group described in S. Hayase et al, J. Polymer Sci., 25, 753 (1987), E. Reichmanis et al, J. Polymer Sci., Polymer Chem. Ed., 23, 1 (1985), Q. Q. Zhu et al, J. Photochem., 36, 85, 39, 317 (1987), B. Amit et al, Tetrahedron Lett., (24) 2205 (1973), D. H. R. Barton et al, J. Chem. Soc., 3571 (1965), P. M. Collins et al, J. Chem. Soc., Perkin I, 1695 (1975), M. Rudinstein et al, Tetrahedron Lett., (17), 1445 (1975), J. W. Walker et al, J. Am. Chem. Soc., 110, 7170 (1988), S. C. Busman et al, J. Imaging Technol., 11 (4), 191 (1985), H. M. Houlihan et al, Macromolecules, 21, 2001 (1988), P. M. Collins et al, J. Chem. Soc., Chem. Commun., 532 (1972), S. Hayase et al, Macromolecules, 18, 1799 (1985), E. Reichmanis et al, J. Electrochem. Soc., Solid State Sci. Technokl., 130 (6), F. M. Houlihan et al, Macromolecules, 21, 2001 (1988), European Patent Application Nos. 0290,750, 046,083, 156, 535, 271,851, and 0,388,343, U.S. Pat. Nos. 3,901,710 and 4,181,531, JP-A Nos. 60-198538 and 53-133022, and others;

the sulfone compounds that photodecompose and generate acid such as iminosulfonates described in M. TUNOOKA et al., Polymer Preprints Japan, 35 (8), G. Berner et al., J. Rad. Curing, 13 (4), W. J. Mijs et al., Coating Technol., 55 (697), 45 (1983), Akzo, H. Adachi et al., Polymer Preprints Japan, 37(3), EP Nos. 0199,672, 84515, 044,115, 618,564, and 0101,122, U.S. Pat. Nos. 4,371,605 and 4,431,774, JP-A Nos. 64-18143, 2-245756, and 3-140109, and others; the disulfonated compounds described in JP-A Nos. 61-166544 and 2-71270, and others; and the diazoketosulfone and diazodisulfone compounds described in JP-A Nos. 3-103854, 3-103856, and 4-210960 and others.

In addition, compounds having a group generating acid by the light described above or polymers having such a compound in the main chain or on the side, including those described in M. E. Woodhouse et al., J. Am. Chem. Soc., 104, 5586 (1982), S. P. Pappas et al., J. Imaging Sci., 30 (5), 218 (1986), S. Kondo et al., Macromol. Chem., Rapid Commun., 9, 625 (1988), Y. Yamada et al., Makromol. Chem., 152, 153, 163 (1972), J. V. Crivello et al., J. Polymer Sci., Polymer Chem. Ed., 17, 3845 (1979), U.S. Pat. No. 3,849,137, German Patent No. 3,914,407, JP-A Nos. 63-26653,55-164824, 62-69263, 63-146038, 63-163452, 62-153853, and 63-146029, and others, may also be used. Examples thereof include onium salts such as diazonium salts, ammonium salts, phosphonium salts, iodonium salts, sulfonium salts, selenonium salts, and arsonium salts; organic halogen compounds, organic metals/organic halides, o-nitrobenzyl protecting group-containing photo initiators, sulfone compounds that generates acid by photochemical decomposition such as iminosulfonates, disulfonated compounds, diazoketosulfones, and diazodisulfone compounds.

Other examples include compounds generating an acid by light described in V. N. R. Pillai, Synthesis, (1), 1 (1980), A. Abad et al, Tetrahedron Lett., (47) 4555 (1971), D. H. R. Barton et al, J. Chem. Soc., (C), 329 (1970), U.S. Pat. No. 3,779,778, and European Patent No. 126,712 and the like.

Favorable examples of the photo initiators for use in the invention include the compounds represented by the following formulae (b1), (b2), and (b3).

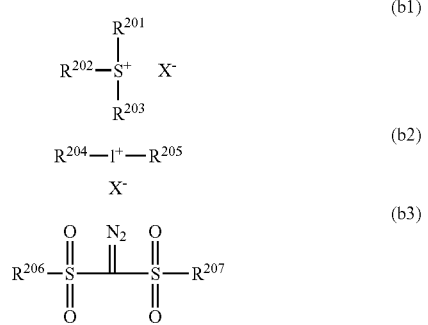

In formula (b1), $R^{201}$, $R^{202}$, and $R^{203}$ each independently represent an organic group. $X^-$ represents a non-nucleophilic anion, and is preferably a sulfonate anion, carboxylate anion, bis(alkylsulfonyl)amide anion, tris(alkylsulfonyl)methide anion, $BF_4^-$, $PF_6^-$, $SbF_6^-$, or a group shown below, and is preferably an organic anion having carbon atoms.

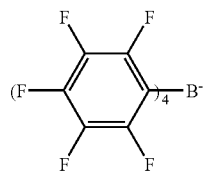

Preferable examples of the organic anion include the following organic anions.

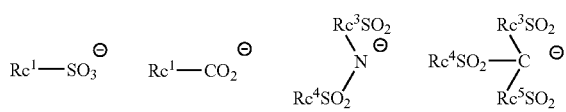

$R^{c1}$ represents an organic group.

Examples of the organic group represented by $R^{c1}$ include those having 1 to 30 carbon atoms, and preferable examples thereof include an alkyl group, a cycloalkyl group, an aryl group, and combinations thereof linked through a single bond or a linking group such as —O—, —CO$_2$—, —S—, —SO$_3$—, or —SO$_2$N(Rd$^1$)—.

$R^{d1}$ represents a hydrogen atom or an alkyl group.

$R^{c3}$, $R^{c4}$, and $R^{c5}$ each independently represent an organic group.

Preferable examples of the organic group of $R^{c3}$, $R^{c4}$, and $R^{c5}$ include the organic groups described as the preferable examples of $R^{c1}$. Each of $R^{c3}$, $R^{c4}$, and $R^{c5}$ is more preferably a perfluoroalkyl group having 1 to 4 carbon atoms.

$R^{c3}$ and $R^{c4}$ may be linked together to form a ring.

Examples of the group formed of by linkage of $R^{c3}$ and $R^{c4}$ include an alkylene group and an arylene group, and the group formed by linkage of $R^{c3}$ and $R^{c4}$ is preferably a perfluoro alkylene group having 2 to 4 carbon atoms.

Each of the organic groups represented by $R^{c1}$, and $R^{c3}$ to $R^{c5}$ is most preferably an alkyl group substituted by a fluorine atom or fluoroalkyl group at the 1 position, or a phenyl group substituted by a fluorine atom or a fluoroalkyl group. By including a fluorine atom or fluoroalkyl group, it is possible to increase the acidity of the acid generated by photoirradiation, thereby improving the sensitivity.

The organic groups of $R^{201}$, $R^{202}$, and $R^{203}$ may usually have 1 to 30 carbon atoms, and preferably 1 to 20 carbon atoms.

Two of $R^{201}$ to $R^{203}$ may be linked together to form a ring structure, and the ring may contain an oxygen atom, a sulfur atom, an ester bond, an amide bond, or a carbonyl group. Examples of the group formed by linkage between two of $R^{201}$ to $R^{203}$ include an alkylene group (for example, a butylene group, and a pentylene group).

Specific examples of the organic groups of $R^{201}$, $R^{202}$, and $R^{203}$ include the corresponding groups in the below-described compounds (b1-1), (b1-2), and (b1-3).

The compound may contain a plurality of the structure represented by formula (b1). For example, at least one of $R^{201}$ to $R^{203}$ of the compound represented by formula (b1) may be bonded to at least one of $R^{201}$ to $R^{203}$ of another compound represented by formula (b1) directly or through a linking group.

Preferable examples of the (b1) component include the compounds (b1-1), (b1-2), and (b1-3) described below.

The compound (b1-1) is an arylsulfonium compound in which at least one of $R^{201}$ to $R^{203}$ of formula (b1) is an aryl group, that is, a compound in which the cation thereof is an aryl sulfonium.

In the arylsulfonium compound, all of $R^{201}$ to $R^{203}$ may be an aryl group, or a part of $R^{201}$ to $R^{203}$ may be an aryl group, with the remainder being an alkyl group or a cycloalkyl group.

Examples of the arylsulfonium compounds include triarylsulfonium compounds, diarylalkylsulfonium compounds, aryldialkylsulfonium compounds, diarylcycloalkylsulfonium compounds, aryldicycloalkylsulfonium compounds, and the like.

The aryl group in the arylsulfonium compounds is preferably an aryl group such as phenyl or naphthyl, or a heteroaryl group such as indole or pyrrole, and more preferably a phenyl or indole residue. When the arylsulfonium compound has two or more aryl groups, the two or more aryl groups may be the same as or different from each other.

The alkyl group that the arylsulfonium compound may have as needed is preferably a straight-chain or branched alkyl group having 1 to 15 carbons, and examples thereof include methyl, ethyl, propyl, n-butyl, sec-butyl, and t-butyl groups and the like.

The cycloalkyl group that the arylsulfonium compound may have as needed is preferably a cycloalkyl group having 3 to 15 carbons, and examples thereof include cyclopropyl, cyclobutyl, and cyclohexyl groups, and the like.

The aryl group, alkyl group, and cycloalkyl group of $R^{201}$ to $R^{203}$ may each have an alkyl group (for example, one having 1 to 15 carbon atoms), a cycloalkyl group (for example, one having 3 to 15 carbon atoms), an aryl group (for example, one having 6 to 14 carbon atoms), an alkoxy group (for example, one having 1 to 15 carbon atoms), a halogen atom, a hydroxyl group, or a phenylthio group as a substituent. As the substituent, a straight-chain or branched alkyl group having 1 to 12 carbon atoms, a cycloalkyl group having 3 to 12 carbon atoms, and a straight-chain, branched, or cyclic alkoxy group having 1 to 12 carbon atoms are preferable, and an alkyl group having 1 to 4 carbon atoms, and an alkoxy group having 1 to 4 carbon atoms are most preferable. The substituent may be introduced at any one of $R^{201}$ to $R^{203}$, or all of $R^{201}$ to $R^{203}$. Also, in cases where $R^{201}$ to $R^{203}$ are an aryl group, it is preferable that the substituent is introduced at the p-position of the aryl group.

Hereinafter, the compound (b1-2) will be described.

The compound (b1-2) is a compound represented by the formula (b1), wherein $R^{201}$ to $R^{203}$ each independently represent a non-aromatic ring-containing organic group. The aromatic rings include aromatic rings containing a heteroatom.

The non-aromatic ring-containing organic group of $R^{201}$ to $R^{203}$ generally has 1 to 30 carbon atoms and preferably 1 to 20 carbon atoms. $R^{201}$ to $R^{203}$ each independently, preferably represent an alkyl, cycloalkyl, allyl, or vinyl group, more preferably a straight-chain, branched, or cyclic 2-oxoalkyl group or an alkoxycarbonylmethyl group, and particularly preferably a straight-chain or branched 2-oxoalkyl group.

The alkyl group of $R^{201}$ to $R^{203}$ may be straight-chain or branched, and is preferably a straight-chain or branched alkyl group having 1 to 10 carbon atoms (for example, a methyl group, an ethyl group, a propyl group, a butyl group, and a pentyl group), and more preferably a straight-chain or branched 2-oxoalkyl group, or a straight-chain or branched alkoxycarbonylmethyl group.

The cycloalkyl group of $R^{201}$ to $R^{203}$ is preferably a cycloalkyl group having 3 to 10 carbon atoms (for example, a cyclopentyl group, a cyclohexyl group, and a norbornyl group), and more preferably a cyclic 2-oxoalkyl group.

The straight-chain, branched, or cyclic 2-oxoalkyl group of $R^{201}$ to $R^{203}$ is preferably a group having >C=O at the 2-position of the above-described alkyl group or cycloalkyl group.

The alkoxy group in the alkoxycarbonylmethyl group of $R^{201}$ to $R^{203}$ is preferably an alkoxy group having 1 to 5 carbon atoms (for example, a methoxy group, an ethoxy group, a propoxy group, a butoxy group, and a pentoxy group).

$R^{201}$ to $R^{203}$ may be further substituted with a halogen atom, an alkoxy group (for example, one having 1 to 5 carbon atoms), a hydroxy group, a cyano group, or a nitro group.

The compound (b1-3) is a compound represented by the following formula (b1-3), i.e., a compound having a phenacyl sulfonium salt structure.

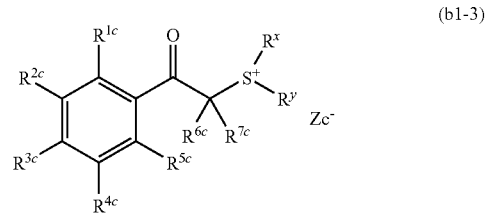

(b1-3)

In formula (b1-3), $R^{1c}$ to $R^{5c}$ each independently represent a hydrogen atom, an alkyl group, a cycloalkyl group, an alkoxy group, or a halogen atom.

$R^{6c}$ and $R^{7c}$ each independently represent a hydrogen atom, an alkyl group, or a cycloalkyl group.

$R^x$ and $R^y$ each independently represent an alkyl group, a cycloalkyl group, an allyl group, or a vinyl group. Any two or more of $R^{1c}$ to $R^{5c}$ may be respectively linked together to form a ring structure. $R^{6c}$ and $R^{7c}$ may be respectively linked together to form a ring structure. $R^x$ and $R^y$ may be linked together to form a ring structure.

Zc$^-$ represents a non-nucleophilic anion, and may be the same as the non-nucleophilic anion of X$^-$ in formula (b1).

The alkyl group of $R^1c$ to $R^{7c}$ may be a straight-chain or branched group, and examples thereof include straight-chain or branched alkyl groups having 1 to 20 carbon atoms, preferably having 1 to 12 carbon atoms, (e.g., methyl, ethyl, straight-chain or branched propyl, straight-chain or branched butyl, and straight-chain or branched pentyl).

The cycloalkyl group of $R^{1c}$ to $R^{7c}$ is preferably a cycloalkyl group having 3 to 8 carbon atoms (for example, a cyclopentyl group, and a cyclohexyl group).

The alkoxy group of $R^{1c}$ to $R^{5c}$ may be a straight-chain, branched, or cyclic group, and examples thereof include alkoxy groups having 1 to 10 carbons, preferably, straight-chain and branched alkoxy groups having 1 to 5 carbons (e.g., methoxy, ethoxy, straight-chain or branched propoxy, straight-chain or branched butoxy, and straight-chain or branched pentoxy groups), and cyclic alkoxy groups having 3 to 8 carbons (e.g., cyclopentyloxy and cyclohexyloxy groups).

Examples of the groups formed by binding of any two or more of $R^{1c}$ to $R^{5c}$, $R^{6c}$ and $R^{7c}$, or $R^x$ and $R^y$ include butylene and pentylene groups and the like. The ring structure may contain an oxygen or sulfur atom or an ester or amide bond.

Preferably, part of the $R^{1c}$ to $R^{5c}$ are straight-chain or branched alkyl groups, cycloalkyl groups, or straight-chain, branched, or cyclic alkoxy groups; and more preferably, the total number of carbons in groups $R^{1c}$ to $R^{5c}$ is 2 to 15. Such a condition is preferable, since under such a condition, the photo initiator may become more soluble in solvent, thereby suppressing generation of particles during storage.

The alkyl group or cycloalkyl group of $R^x$ and $R^y$ may be the same as the alkyl group or cycloalkyl group of $R^{1c}$ to $R^{7c}$.

$R^x$ and $R^y$ are preferably a 2-oxoalkyl group or an alkoxycarbonylmethyl group.

The 2-oxoalkyl group may be a group having >C=O at the 2-position of the alkyl group or cycloalkyl group of $R^{1c}$ to $R^{5c}$.

The alkoxy group in the alkoxycarbonylmethyl group may be the same as the alkoxy group of $R^{1c}$ to $R^{5c}$.

$R^x$ and $R^y$ are each preferably an alkyl group or cycloalkyl group having 4 or more carbon atoms, and more preferably an alkyl group or cycloalkyl group having 6 or more carbon atoms, and further preferably an alkyl group or cycloalkyl group having 8 or more carbon atoms.

In formulae (b2) and (b3), $R^{204}$ to $R^{207}$ each independently represent an aryl group, an alkyl group, or a cycloalkyl group. $X^-$ represents a non-nucleophilic anion, and may be the same as the non-nucleophilic anion as $X^-$ in formula (b1).

The aryl group of $R^{204}$ to $R^{207}$ is preferably a phenyl or naphthyl group and more preferably a phenyl group. The alkyl group of $R^{204}$ to $R^{207}$ may be a straight-chain or branched group, and is preferably, for example, a straight-chain or branched alkyl group having 1 to 10 carbons (e.g., methyl, ethyl, propyl, butyl, or pentyl). The cycloalkyl group of $R^{204}$ to $R^{207}$ is preferably, for example, a cycloalkyl group having 3 to 10 carbons (e.g., cyclopentyl, cyclohexyl, or norbornyl).

Examples of the substituent groups that $R^{204}$ to $R^{207}$ may have include alkyl groups (e.g., those having 1 to 15 carbon atoms), cycloalkyl groups (e.g., those having 3 to 15 carbon atoms), aryl groups (e.g., those having 6 to 15 carbon atoms), alkoxy groups (e.g., those having 1 to 15 carbon atoms), halogen atoms, a hydroxyl group, a phenylthio group, and the like.

Other usable examples of the compounds that generates acid by irradiation of activated light or radiation ray include the compounds represented by the following formulae (b4), (b5), and (b6).

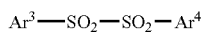
(b4)

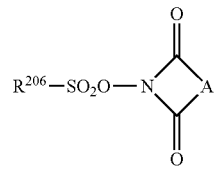
(b5)

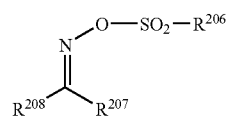
(b6)

In formulae (b4) to (b6), $Ar^3$ and $Ar^4$ each independently represent an aryl group.

$R^{206}$, $R^{207}$ and $R^{208}$ each independently represent an alkyl, cycloalkyl or aryl group.

A represents an alkylene, alkenylene or arylene group.

Preferable examples of a photo initiator include compounds represented by formulae (b1) to (b3). Among these photo initiators, those having a sulfonium salt structure are preferable, those having a triaryl sulfonium salt structure are more preferable, and those having a tri(chlorophenyl)sulfonium salt structure are even more preferable. Examples of a photoinitiator having a tri(chlorophenyl)sulfonium salt structure include exemplary compounds (b-37) to (b-40), which are shown in the lists of preferable exemplary compounds as a photo initiator in the below.

Preferable exemplary compounds (b-1) to (b-96) will be shown below. However, the present invention is not limited to these exemplary compounds.

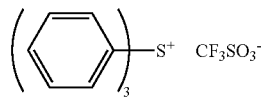
(b-1)

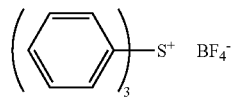
(b-2)

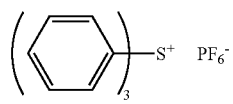
(b-3)

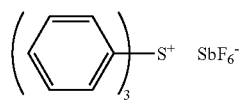
(b-4)

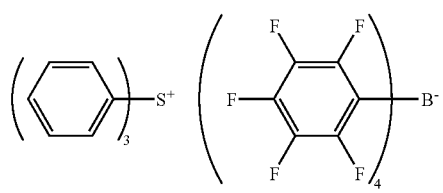
(b-5)

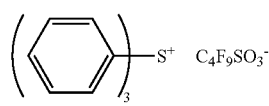
(b-6)

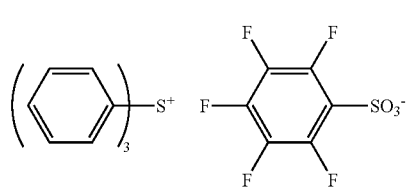
(b-7)

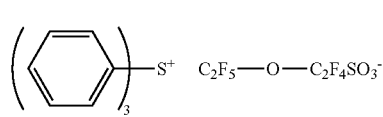
(b-8)

-continued
(b-9)
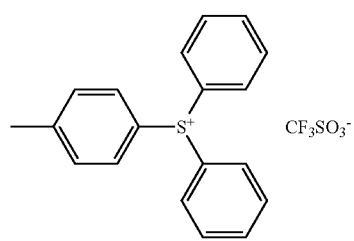
(b-10)
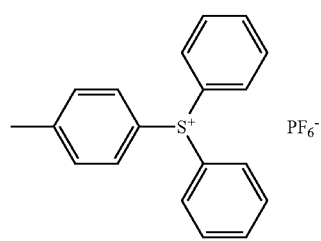
(b-11)
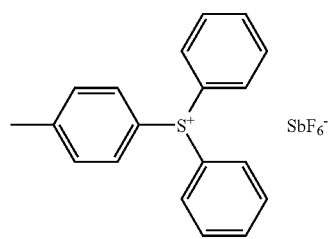
(b-12)
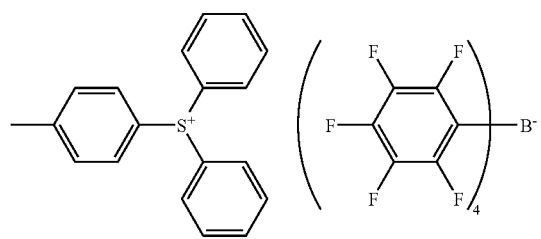
(b-13)
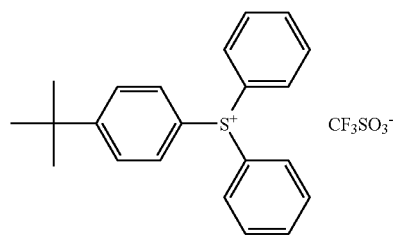
(b-14)
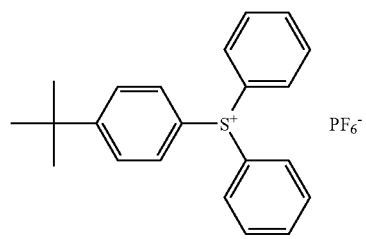
(b-15)
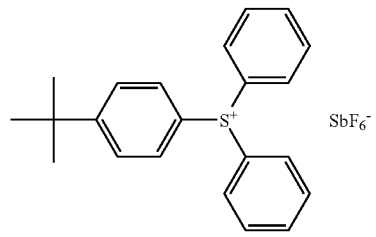
(b-16)
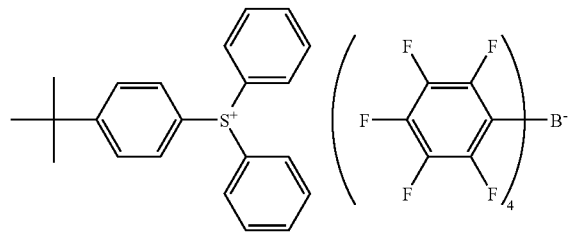
(b-17)
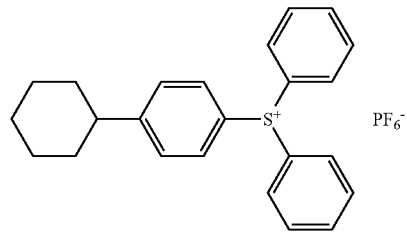
(b-18)
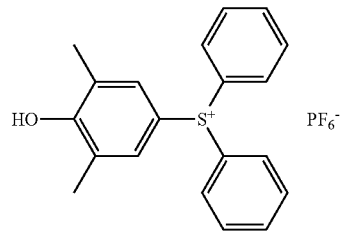
(b-19)
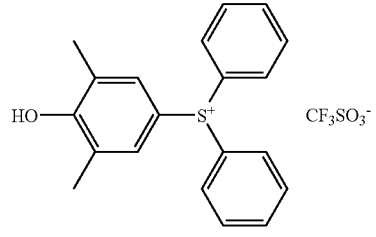
(b-20)
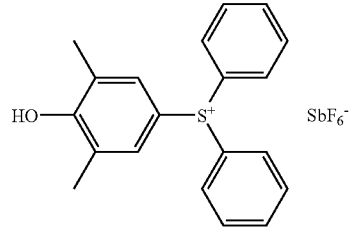

-continued
(b-21)
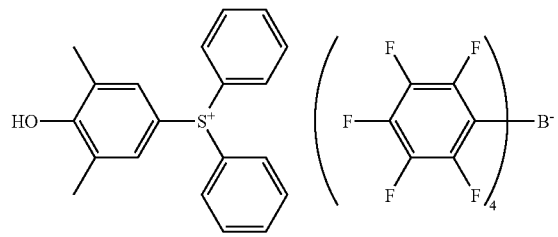
(b-22)
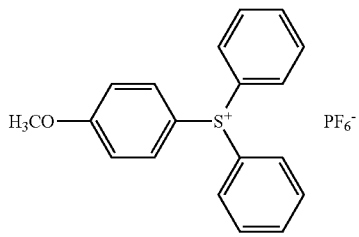
(b-23)
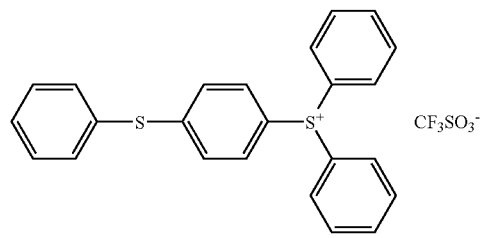
(b-24)
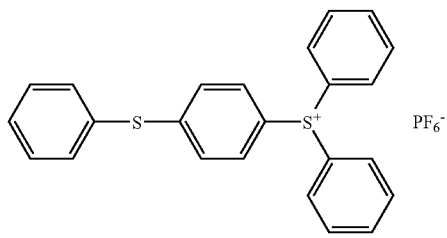
(b-25)
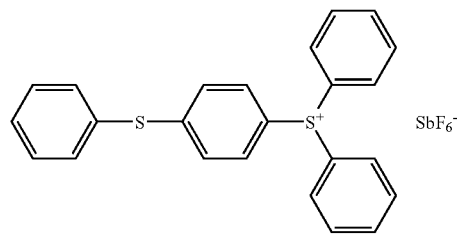
(b-26)
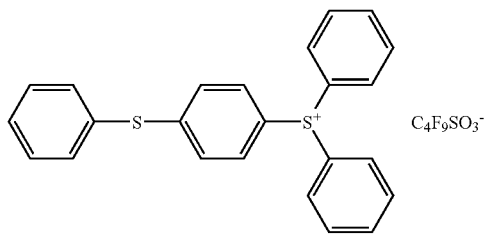
(b-27)
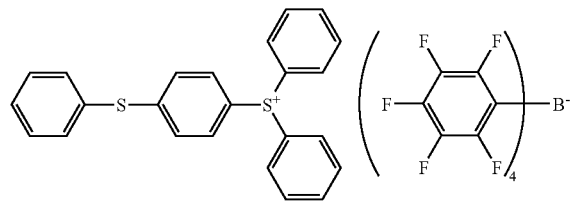
(b-28)
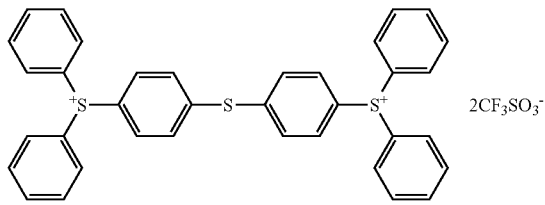
(b-29)
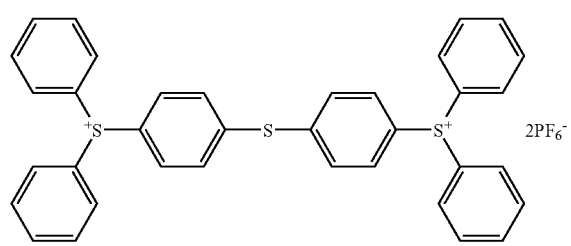
(b-30)
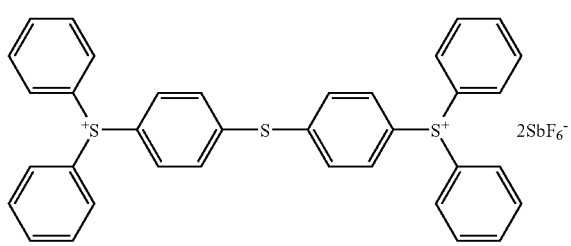
(b-31)
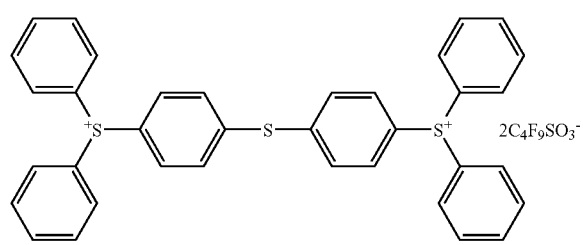

-continued

-continued
(b-49)
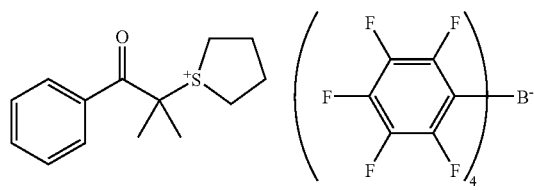
(b-50)
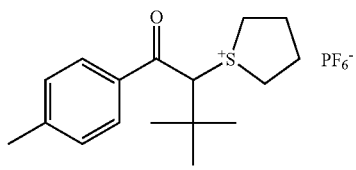
(b-51)
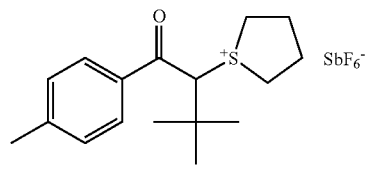
(b-52)
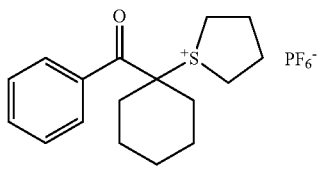
(b-53)
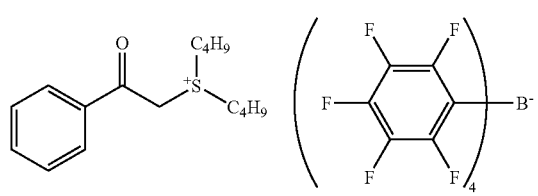
(b-54)
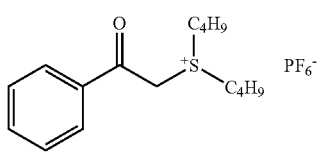
(b-55)
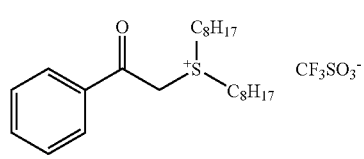
(b-56)
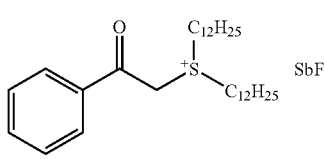
(b-57)
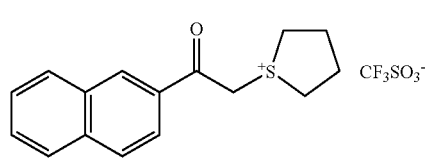
(b-58)
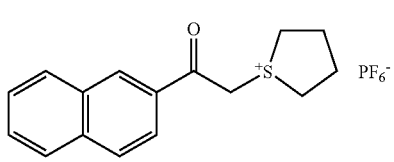
(b-59)
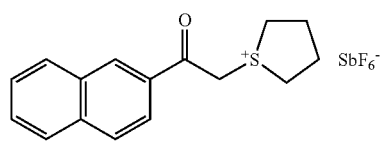
(b-60)
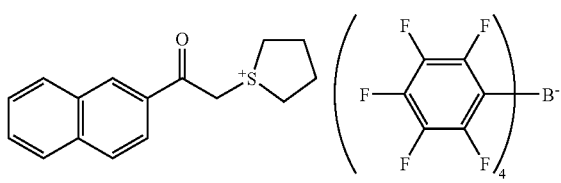
(b-61)
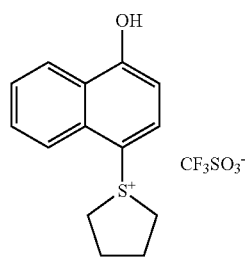
(b-62)
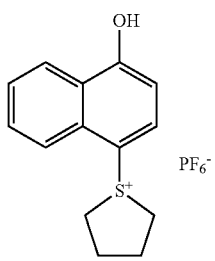
(b-63)
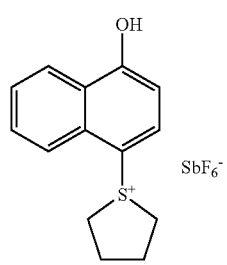
(b-64)
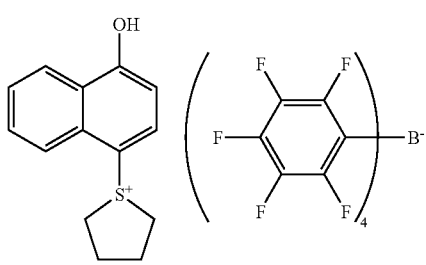

-continued
(b-65)
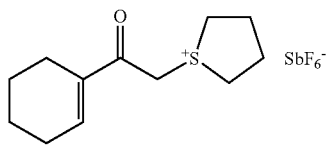
(b-66)
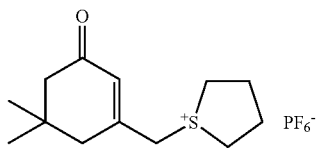
(b-67)
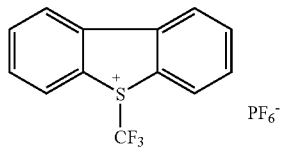
(b-68)
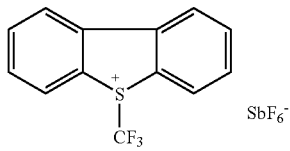
(b-69)
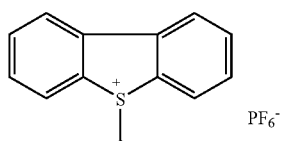
(b-70)
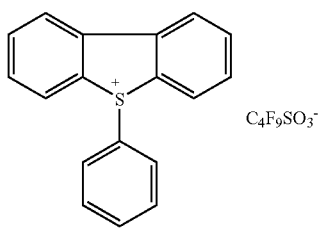
(b-71)
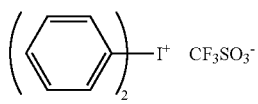
(b-72)
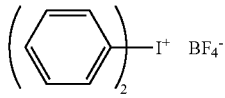
(b-73)
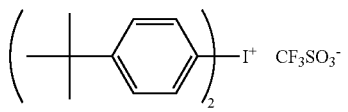
(b-74)
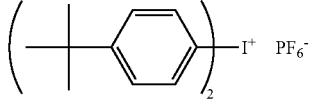
(b-75)
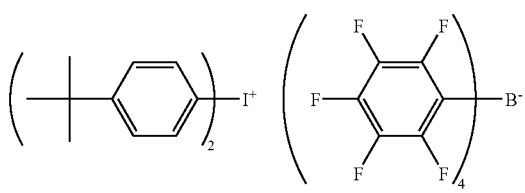
(b-76)
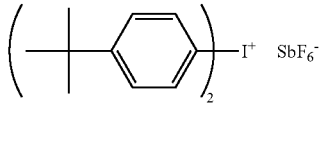
(b-77)
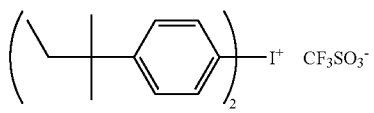
(b-78)
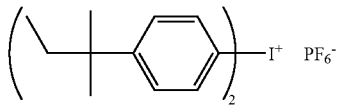
(b-79)
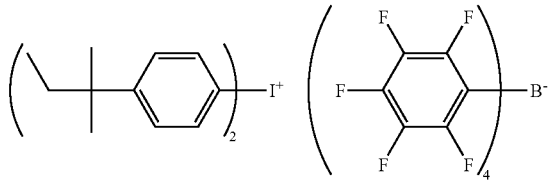
(b-80)
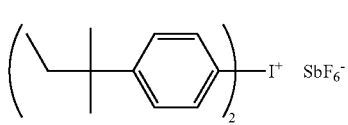
(b-81)
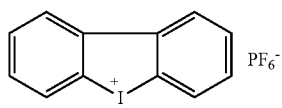
(b-82)
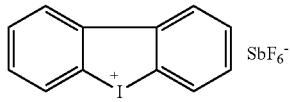
(b-83)
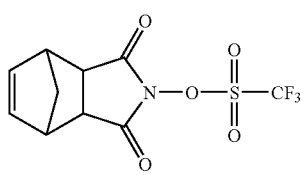
(b-84)
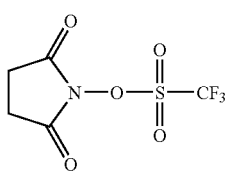

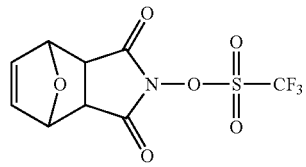
(b-85)

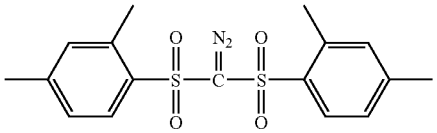
(b-86)

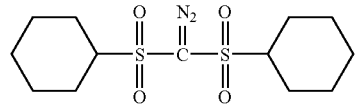
(b-87)

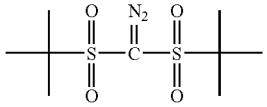
(b-88)

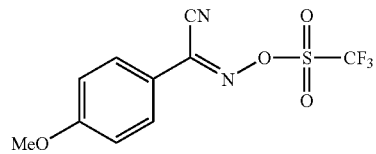
(b-89)

(b-90)

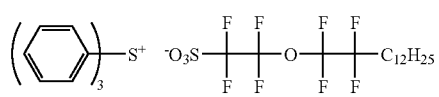
(b-91)

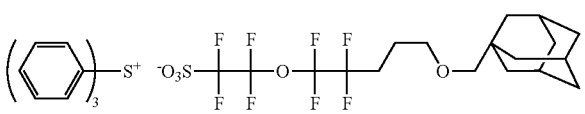
(b-92)

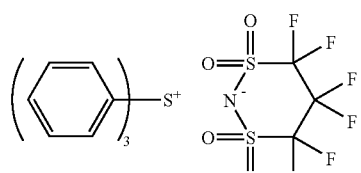
(b-93)

(b-94)

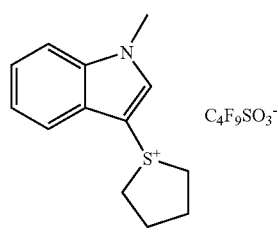
(b-95)

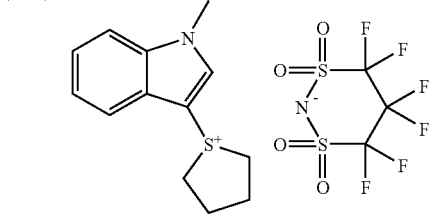
(b-96)

In addition, the oxazole derivatives, s-triazine derivatives and the like described in JP-A No. 2002-122994, paragraph Nos. (0029) to (0030), may also be used favorably.

Further, the onium salt compounds and sulfonate compounds exemplified in JP-A No. 2002-122994, paragraph Nos. (0037) to (0063), may also be used favorably.

The photo initiator may be used alone or in combination of two or more of them.

The content of the photo initiator(s) in the ink composition is preferably 0.1 to 20 mass %, more preferably 0.5 to 10 mass %, and further preferably 1 to 7 mass % in terms of the total solid content of the ink composition.

<Coloring Agent>

The ink composition according to the invention may contain a coloring agent.

The coloring agent that may be used in the invention is not particularly limited, but is preferably a pigment or an oil soluble dye having excellent weather resistance and color reproducibility, and may be optionally selected from known coloring agents such as solubility dyes. The coloring agent which can be suitably used for the ink composition according to the invention preferably does not function as a polymerization inhibitor in the polymerization reaction for curing. This is to prevent the decrease in the sensitivity of the curing reaction by active radiation.

Pigment

The pigment is not particularly limited, and any one of common commercially available pigments, including organic and inorganic pigments, dispersions of the pigment dispersed in an insoluble resin, and pigments surface-grafted with a resin, may be used. In addition, dyed resin particles may also be used. Such pigments include the pigments described, for example, in Seijiro Itoh Ed., "Ganryo no Jiten (Dictionary of Pigments)" (2000), W. Herbst K. Hunger, "Industrial Organic Pigments", and JP-A Nos. 2002-12607, 2002-188025, 2003-26978, and 2003-342503.

Specific Examples of the organic and inorganic pigments exhibiting yellow color employable in the invention include monoazo pigments such as C.I. Pigment Yellow 1 (Fast Yellow G, etc.) and C.I. Pigment Yellow 74, disazo pigments such as C.I. Pigment Yellow 12 (Disazo Yellow AAA, etc.) and C.I. Pigment Yellow 17, non-benzidine azo pigments such as C.I. Pigment Yellow 180, azolake pigments such as C.I. Pigment Yellow 100 (tartrazine yellow lake, etc.), condensation azo pigments such as C.I. Pigment Yellow 95 (condensation azo yellow GR, etc.), acidic dye lake pigments such as C.I. Pigment Yellow 115 (quinoline yellow lake, etc.), basic dye lake pigments such as C.I. Pigment Yellow 18 (thioflavin lake, etc.), anthraquinone pigments such as fravantrone yellow (Y-24), isoindolinone pigments such as isoindolinone yellow 3RLT (Y-110), quinophtharone pigments such as quinophtharone yellow (Y-138), isoindoline pigments such as isoindoline yellow (Y-139), nitroso pigments such as C.I. Pigment Yellow 153 (nickel nitroso yellow, etc.), metal complex salt azomethine pigments such as C.I. Pigment Yellow 117 (copper azomethine yellow, etc.), and the like.

Examples thereof exhibiting red or magenta color include monoazo pigments such as C.I. Pigment Red 3 (toluidine red, etc.), disazo pigments such as C.I. pigment red 38 (pyrazolone red B, etc.), azolake pigments such as C.I. Pigment Red 53:1 (lake red C, etc.) and C.I. Pigment Red 57:1 (Brilliant Carmine 6B), condensation azo pigments such as C.I. Pigment Red 144 (condensation azo red BR, etc.), acidic dye lake pigments such as C.I. Pigment Red 174 (phloxine B lake, etc.), basic dye lake pigments such as C.I. Pigment Red 81 (rhodamine 6 G' lake, etc.), anthraquinone pigments such as C.I. Pigment Red 177 (dianthraquinonyl red, etc.), thioindigo pigments such as C.I. Pigment Red 88 (Thioindigo Bordeaux, etc.), perynone pigments such as C.I. Pigment Red 194 (perynone red, etc.), perylene pigments such as C.I. pigment red 149 (perylene scarlet, etc.), quinacridone pigments such as C.I. Pigment Violet 19 (unsubstituted quinacridone) and C.I. Pigment Red 122 (quinacridone magenta, etc.), isoindolinone pigments such as C.I. Pigment Red 180 (isoindolinone red 2BLT, etc.), alizarin lake pigments such as C.I. Pigment Red 83 (madder lake, etc.), and the like.

Examples thereof exhibiting blue or cyan color include disazo pigments such as C.I. Pigment Blue 25 (dianisidine blue, etc.), phthalocyanine pigments such as C.I. Pigment Blue 15 (phthalocyanine blue, etc.), acidic dye lake pigments such as C.I. Pigment Blue 24 (peacock blue lake, etc.), basic dye lake pigments such as C.I. Pigment Blue 1 (Victria Pure Blue BO lake, etc.), anthraquinone pigments such as C.I. Pigment Blue 60 (indanthron blue, etc.), alkali blue pigments such as C.I. Pigment Blue 18 (alkali Blue V-5:1), and the like.

Examples of the pigment exhibiting green color include phthalocyanine pigments such as C.I. Pigment Green 7 (phthalocyanine green) and C.I. Pigment Green 36 (phthalocyanine green), and azometal complex pigments such as C.I. Pigment Green 8 (nitroso green). Examples of the pigment exhibiting orange color include isoindoline-based pigments such as C.I. Pigment Orange 66 (isoindoline orange), and anthraquinone-based pigments such as C.I. Pigment Orange 51 (dichloropyranthrone orange).

Examples of the pigment exhibiting black color include carbon black, titanium black, and aniline black.

Specific examples of the white pigments include basic lead carbonate ($2PbCO_3Pb(OH)_2$, so-called silver white), zinc oxide (ZnO, so-called zinc white), titanium oxide ($TiO_2$, so-called titanium white), and strontium titanate ($SrTiO_3$, so-called titanium strontium white).

Titanium oxide has a lower density and a higher refractive index than other white pigments, is more stable chemically or physically, and thus, has a greater masking and coloring potentials as a pigment, and is excellent in resistance to acid or alkali and other environmental factors. Thus, use of titanium oxide as the white pigment is preferable. Other white pigments (including white pigments other than those described above) may be used as needed.

For dispersing the pigment, any one of dispersing machines, such as ball mill, sand mill, attriter, roll mill, jet mill, homogenizer, paint shaker, kneader, agitator, HENSCHEL mixer, colloid mill, ultrasonic wave homogenizer, pearl mill, and wet jet mill, may be used.

It is also possible to add a dispersant during dispersion of the pigment. Examples of the dispersants include hydroxyl group-containing carboxylic acid esters, salts of a long-chain polyaminoamide with a high-molecular weight acid ester, high-molecular weight polycarboxylic acid salts, high-molecular weight unsaturated acid esters, high-molecular weight copolymers, modified polyacrylates, polyvalent aliphatic carboxylic acids, naphthalenesulfonic acid/formalin condensates, polyoxyethylene alkylphosphoric esters, pigment derivatives, and the like. Use of a commercially available polymer dispersant such as a SOLSPERSE series product manufactured by Zeneca is also preferable.

A dispersion aid suitable for the pigment may be used as a dispersion aid. The dispersant and dispersion aid are preferably added in an amount of 1 to 50 parts by mass with respect to 100 parts by mass of the pigment.

A solvent may be added as the dispersion medium for various components such as pigment in the ink composition of the present invention or alternatively, the cationic polymerizable compound above, which is a low-molecular weight component, may be used without solvent; but, the ink composition according to the invention preferably contains no solvent, because the composition is a radiation-curing ink that is hardened after application on a recording medium. It is because the solvent remaining in the hardened ink image leads to deterioration in solvent resistance and causes a problem of VOC (Volatile Organic Compound). From the viewpoints above, the cation polymerizable compound is preferably used as the dispersion medium, and selection of a cation polymerizable monomer lowest in viscosity among them is preferable for improvement in dispersibility and proccessability of the ink composition.

The average diameter of the pigment is preferably in the range of 0.02 to 0.4 μm, more preferably 0.02 to 0.1 μm, and still more preferably 0.02 to 0.07 μm.

The pigment, the dispersant, and dispersion medium are selected and the dispersion and filtration conditions are determined in such a manner that the average diameter of the pigment particles falls in the preferable range above. Control of particle diameter enables prevention of the clogging in head nozzles and preservation of the storage stability, transparency and curing efficiency of ink.

Dye

The dye for use in the invention is preferably an oil soluble dye. Specifically, the dye preferably has a solubility in water (mass of the colorant dissolved in 100 g of water) of 1 g or less at 25° C., preferably 0.5 g or less, and more preferably 0.1 g or less. Accordingly, so-called water-insoluble and oil soluble dyes are used favorably.

As for the dyes for use in the invention, it is preferable to introduce an oil-solubilizing group on the basic dye structure described above, to ensure that the dye is dissolved in the amount needed in the ink composition.

Examples of the oil-solubilizing groups include long-chain or branched alkyl groups, long-chain or branched alkoxy groups, long-chain or branched alkylthio groups, long-chain or branched alkylsulfonyl groups, long-chain or branched acyloxy groups, long-chain or branched alkoxycarbonyl groups, long-chain or branched acyl groups, long-chain or branched acylamino groups, long-chain or branched alkylsulfonylamino groups, long-chain or branched alkylaminosulfonyl groups, as well as aryl, aryloxy, aryloxycarbonyl, arylcarbonyloxy, arylaminocarbonyl, arylaminosulfonyl, and arylsulfonylamino groups containing these long-chain or branched substituent groups, and the like.

Alternatively, it is also possible to introduce an oil-solubilizing group, such as alkoxycarbonyl, aryloxycarbonyl, alkylaminosulfonyl or arylaminosulfonyl, on water-soluble dyes containing carboxylic acid or sulfonic acid groups, by using a long-chain branched alcohol, amine, phenol, or aniline derivative.

The melting point of the oil soluble dye is preferably 200° C. or lower, more preferably 150° C. or lower, and further preferably 100° C. or lower. Through the use of an oil soluble dye having a low melting point, crystallization of the dye in the ink composition is suppressed, which improves the storage stability of the ink composition.

The dye preferably has an higher oxidation potential for achieving higher resistance to fading in particular caused by oxidizers such as ozone, and better curing properties. Accordingly, the oxidation potential of the oil soluble dye used in the invention is preferably 1.0 V (vs SCE) or higher, more preferably 1.1 V (vs SCE) or higher, and particularly preferably 1.15 V (vs SCE) or higher.

The yellow dyes having the structure represented by the formula (Y-I) described in JP-A 2004-250483 are preferable. Example of the dyes particularly preferable include the dyes represented by the formulae (Y-II) to (Y-IV) in JP-A No. 2004-250483, paragraph No. (0034), and typical examples thereof include the compounds described in JP-A No. 2004-250483, paragraph Nos. (0060) to (0071). The oil soluble dyes represented by the formula (Y-I) described therein may be used not only in yellow ink, but also in inks in any other colors such as black and red.

The compounds having the structures represented by the formulae (3) and (4) in JP-A No. 2002-114930 are preferable as the magenta dyes; and typical examples thereof include the compounds described in JP-A No. 2002-114930, paragraph Nos. (0054) to (0073). Particularly preferable dyes are the azo dyes represented by the formulae (M-1) to (M-2) in JP-A No. 2002-121414, paragraph Nos. (0084) to (0122), and typical examples thereof include the compounds described in JP-A No. 2002-121414, paragraph Nos. (0123) to (0132). The oil soluble dyes represented by the formulae (3), (4), and (M-1) to (M-2) may be used not only in magenta ink, but also in inks in any other colors such as black and red inks.

Examples of the cyan dyes include the dyes represented by the formulae (I) to (IV) described in JP-A No. 2001-181547, and the formulae (IV-1) to (IV-4) described in JP-A No. 2002-121414, paragraph Nos. (0063) to (0078), and specific examples thereof include the compounds described in JP-A No. 2001-181547, paragraph Nos. (0052) to (0066), and JP-A No. 2002-121414, paragraph Nos. (0079) to (0081). Examples of the particularly preferable dyes include the phthalocyanine dyes represented by the formulae (C-I) and (C-II) described in JP-A No. 2002-121414, paragraph Nos. (0133) to (0196), and the phthalocyanine dye represented by the formula (C-II) is even further preferable. Specific examples thereof include the compounds described in JP-A No. 2002-12141, paragraph Nos. (0198) to (0201). The oil soluble dyes represented by the formulae (I) to (IV), (IV-1) to (IV-4), (C-I), and (C-II) are applicable to an ink of any color other than cyan, such as black ink and green ink.

These coloring agents are preferably added to the ink composition in an amount of 1 to 20 mass %, more preferably 2 to 10 mass % in terms of solid matter.

<Other Components>

Various additives which may be added as needed to the ink composition according to the invention are described below.

Ultraviolet Absorbent

An ultraviolet absorbent may be added to the ink composition according to the invention, for improvement in weather fastness and prevention of discoloration of the image obtained.

Examples of the ultraviolet absorbents include the benzotriazole compounds described in JP-A Nos. 58-185677, 61-190537, 2-782, 5-197075 and 9-34057 and others; the benzophenone compounds described in JP-A Nos. 46-2784 and 5-194483, U.S. Pat. No. 3,214,463, and others; the cinnamic acid compounds described in JP-B Nos. 48-30492 and 56-21141, JP-A No. 10-88106, and others; the triazine compounds described in JP-A Nos. 4-298503, 8-53427, 8-239368, 10-182621, and 8-501291, and others; the compounds described in Research Disclosure No. 24239; compounds emitting fluorescence by absorbing ultraviolet ray such as stilbene and benzoxazole compounds; so-called fluorescent brighteners; and the like.

The addition amount may be decided suitably according to applications, but is generally, approximately 0.5 to 15 mass % in terms of solid matter.

Sensitizer

In the invention, a sensitizer may be added for the purposes of improving the efficiency of acid generation by the photo initiator, and extending the photosensitive wavelength of the photo initiator. The sensitizer may be any sensitizer which sensitizes the photo initiator through an electron transfer mechanism or an energy transfer mechanism. Preferable examples thereof include fused polycyclic aromatic compounds such as anthracene, 9,10-dialkoxyanthracene, pyrene, and perylene, aromatic ketone compounds such as acetophenone, benzophenone, thioxanthone, and Michler ketone, and heterocyclic compounds such as phenothiazine and N-aryloxazolidinone. The addition amount is selected properly according to applications, but, preferably 0.01 to 1 mole %, and more preferably 0.1 to 0.5 mole % with respect to the photo initiator.

Antioxidant

An antioxidant may be added, for improvement of stability of the ink composition. Examples of the antioxidants include those described in EP Laid-Open Nos. 223739, 309401, 309402, 310551, 310552, and 459416, German Patent Laid-Open No. 3435443, JP-A Nos. 54-48535, 62-262047, 63-113536, 63-163351, 2-262654, 2-71262, 3-121449, 5-61166, and 5-119449, U.S. Pat. Nos. 4,814,262 and 4,980,275, and others.

The addition amount is decided properly according to applications, but generally, approximately 0.1 to 8 mass % in terms of solid matter.

Antifading Agent

Various types of organic antifading agents and metal complex antifading agents may be used according to the invention. Examples of the organic antifading agents include hydroquinones, alkoxy phenols, dialkoxy phenols, phenols, anilines, amines, indanes, chromanes, alkoxy anilines, and heterocycles. Examples of the metal complex antifading agents include nickel complexes and zinc complexes. Specific examples thereof include the compounds described in patents cited in Research Disclosure No. 17643, VII, Sections I to J, Research Disclosure No. 15162, Research Disclosure No. 18716, p. 650 left column, Research Disclosure No. 36544, p. 527, Research Disclosure No. 307105, p. 872, and Research Disclosure No. 15162, and the compounds included in the formula of typical compounds and compound examples described in JP-A No. 62-215272, pp. 127-137.

The addition amount is selected properly according to applications, but preferably 0.1 to 8 mass % in terms of solid matter.

Conductive Salt

A conductive salt such as potassium thiocyanate, lithium nitrate, ammonium thiocyanate, and dimethylamine hydrochloride may be added according to the invention, for the purpose of controlling the ejection properties.

Solvent

Addition of an extremely trace amount of organic solvent to the ink composition according to the invention is effective for improvement in adhesiveness to the recording medium.

Examples of the solvents include ketone solvents such as acetone, methylethylketone, and diethylketone; alcohol solvents such as methanol, ethanol, 2-propanol, 1-propanol, 1-butanol, and tert-butanol; chlorine-based solvents such as chloroform, and methylene chloride; aromatic solvents such as benzene and toluene; ester solvents such as ethyl acetate, butyl acetate, and isopropyl acetate; ether solvents such as diethylether, tetrahydrofuran, and dioxane; glycol ether solvents such as ethylene glycol monomethyl ether and ethylene glycol dimethyl ether; and the like.

In such a case, the amount of the solvent added is in the range that does not cause problems of solvent resistance and VOC, and thus, preferably in the range of 0.1 to 5 mass %, more preferably 0.1 to 3 mass %, with respect to the entire ink composition.

Polymer Compound

Various types of polymer compounds may be added in the invention for the purpose of controlling the physical properties of the film. Examples of the polymer compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinyl resins, acrylic resins, rubber resin, waxes, other natural resins, and the like. These compounds may be used in combination of two or more. Among them, vinyl copolymers obtained by copolymerization with an acrylic monomer are preferable. In addition, copolymers containing a "carboxyl group-containing monomer", an "alkyl methacrylate ester", or an "alkyl acrylate ester" as the structural unit as a copolymerization component are also used favorably for the polymer binding material.

Surfactant

Surfactants may be added in the ink composition of the invention. The surfactants include those described in JP-A Nos. 62-173463 and 62-183457. Examples thereof include anionic surfactants such as dialkylsulfosuccinic acid salts, alkylnaphthalenesulfonic acid salts, and fatty acid salts; nonionic surfactants such as polyoxyethylene alkylethers, polyoxyethylene alkylallylethers, acetylene glycol, and polyoxyethylene-polyoxypropylene block copolymers; cationic surfactants such as alkylamine salts and quaternary ammonium salts; and the like. An organic fluoro compound may be used instead of the surfactant. The organic fluoro compound is preferably hydrophobic. Examples of the organic fluoro compounds include fluorochemical surfactants, oily fluorochemical compounds (e.g., fluorine oil) and solid fluorochemical compound resins (e.g., tetraethylenefluoride resin); and typical examples thereof include those described in JP-B No. 57-9053 (Columns 8 to 17) and JP-A No. 62-135826.

In addition, a leveling additive, a matting agent, a wax for adjustment of film physical properties, or a tackifier for improvement of the adhesiveness to the recording medium such as of polyolefin and PET that does not inhibit polymerization may be added as needed to the ink composition according to the invention.

Typical examples of the tackifiers include the high-molecular weight adhesive polymers described in JP-A No. 2001-49200, pp. 5 to 6 (e.g., copolymers of a (meth)acrylic ester and an alcohol with an alkyl group having 1 to 20 carbons, of a (meth)acrylic ester and an alicyclic alcohol having 3 to 14 carbons, and of a (meth)acrylic ester and an aromatic alcohol having 6 to 14 carbons), and low-molecular weight adhesive resin containing a polymerizable unsaturated bond, and the like.

<Preferred Property of Ink Composition>

In cases where the ink composition according to the invention is used as an inkjet recording ink, in consideration of the ejection properties, the viscosity is preferably 7 to 30 mPa·s, and more preferably 7 to 20 mPa·s at the temperature during ejection (for example 25 to 80° C., preferably 25 to 30° C.). For example, the viscosity of the ink composition according to the invention at room temperature (25 to 30° C.) is preferably 35 to 500 mPa·s, and more preferably 35 to 200 mPa·s. The composition ratio of the ink composition according to the invention is preferably adjusted properly in such a manner that the viscosity falls within the above-described range. When the composition is highly viscous at room temperature, ink penetration into a recording medium is avoided even if the recording medium is porous, which allows to reduce the amount of uncured monomers and odors. Further, bleeding of the landed ink droplets is reduced, which results in the improvement of image quality.

The surface tension of the ink composition according to the invention is preferably 20 to 30 mN/m, and more preferably 23 to 28 mN/m. When the ink composition according to the invention is used on various recording media such as polyolefin, PET, coated paper, and non-coated paper, the surface tension thereof is preferably 20 mN/m or more for prevention of ink bleeding and penetration, and 30 mN/m or less for improvement in wettability therewith.

Image formation using an ink composition of the invention include ejecting the ink composition onto a recording medium using an inkjet printer, and curing the ejected ink composition by irradiating the ejected ink composition with radiation, thereby conducting recording.

Since the image portion is cured by irradiation of the radiation such as ultraviolet rays, and the image portion has an excellent strength, the printed material obtained by the ink composition may be used for various usages in addition to image formation by the ink.

<Inkjet Recording Method and Printed Material>

The inkjet recording method to which the ink composition according to the invention is favorably applied (the inkjet recording method according to the invention) is further described below.

The inkjet recording method according to the invention includes: ejecting the ink composition according to the invention onto a recording medium (for example, a support or a recording material) using an inkjet recording apparatus, and irradiating the ejected ink composition with active radiation to cure the ink composition. The cured ink composition forms an image on the recording medium.

The recording medium applicable to the inkjet recording method according to the invention is not particularly limited, and examples thereof include papers such as ordinary uncoated paper and coated paper, various unabsorbent resin materials and films thereof used for so-called soft packaging. Examples of the various plastic films include a PET film, an OPS film, an OPP film, an ONy film, a PVC film, a PE film, and a TAC film. Other examples of the plastics useful as the recording medium material include, polycarbonate, acrylic resins, ABS, polyacetal, PVA, and rubbers. Metals and glasses are also useful as the recording medium.

In addition to the above, detailed items such as various conditions applied to the inkjet recording method of the invention and the inkjet recording apparatus will be described later.

Since the aforementioned ink composition of the invention is employed in the inkjet recording method of the invention, an image excellent in abrasion resistance, antiblocking property and flexibility can be formed. The active radiation may be irradiated at once after ejecting all the colors, but the irradiation after each color ejection is more preferable from the viewpoint of accelerating the curing.

The printed material of the invention is one in which an image has been formed with the ink composition of the invention while employing the above-described inkjet recording method (inkjet recording method of the invention).

Consequently, it is a printed material having an image excellent in abrasion resistance, antiblocking property and flexibility.

Inkjet Recording Apparatus

The inkjet recording apparatus used in the invention is not particularly limited, and any one of commercially available inkjet recording apparatuses may be used. That is, in the invention, an image may be recorded on a recording medium by using a commercially available inkjet recording apparatus.

The inkjet recording apparatus used in the invention has, for example, an ink-supplying system, a temperature sensor, and an active radiation source. The ink-supplying system further has, for example, a stock tank storing an inkjet composition according to the invention, a supply pipe, an inkjet composition-supplying tank immediately before the inkjet head, a filter, and a piezoelectric inkjet head. The piezoelectric inkjet head allows ejection of multi-sized dots in amounts of 1 to 100 pl, preferably, 8 to 30 pl, at a definition, for example, of 320×320 to 4,000×4,000 dpi, preferably 400× 400 to 1,600×1,600 dpi, and more preferably 720×720 dpi. The "dpi" in the invention means the dot number per 2.54 cm.

As described above, since a radiation curable ink preferably has a constant temperature at the time of ejection, the section from the ink supply tank to the inkjet head may be preferably thermally insulated and heated. The method for controlling the temperature is not limited, and preferable examples thereof include a method of providing a plurality of temperature sensors in piping areas, thereby controlling the temperature in accordance with the ink flow and the environmental temperature. The temperature sensors may be provided on the ink supply tank and in the vicinity of the nozzle of the inkjet head. The head unit to be heated is preferably thermally blocked or insulated to prevent the main body of the apparatus being affected by the temperature of an external air. In order to reduce the warm-up time of the printer, or reduce the heat energy loss, it is preferable that the head unit be thermally insulated from other sections, and the thermal capacity of the whole unit to be heated be preferably smaller.

The ink composition ejected onto the surface of a hydrophilic support is cured by irradiation with active radiation. At this time, if there is a sensitizing dye present together with a photo initiator in the ink composition, then the sensitizing dye in the system is activated into an excited state by absorption of the active radiation, accelerating decomposition of the initiator upon contact with the polymerization initiator, and a more sensitive curing reaction may be achieved.

Examples of the active radiation used herein include a rays, y rays, electron beam, X rays, ultraviolet light, visible light, and infrared light. Although the peak wavelength of the active radiation varies according to the absorption properties of the sensitizing dye, but is, for example, 200 to 600 nm, preferably 300 to 450 nm, and more preferably 350 to 420 nm. In the invention, the polymerization initiating system has sufficient sensitivity even to a low power active radiation. Accordingly, the power of the active radiation as irradiation energy is, for example, 2,000 $mJ/cm^2$ or less, preferably from 10 to 2,000 $mJ/cm^2$, more preferably from 20 to 1,000 $mJ/cm^2$, and further preferably from 50 to 800 $mJ/cm^2$. Further, the active radiation is applied so that the illumination intensity on the exposed surface is, for example, from 10 to 2,000 $mW/cm^2$, and preferably from 20 to 1,000 $mW/cm^2$.

Mercury lamps, gas or solid state lasers and the like have been widely used as active radiation sources, and mercury lamps and metal halide lamps are widely used in ultraviolet-curing inkjet printers. However, under the current urgent need for mercury-free devices from the viewpoint of environmental protection, substitution thereof with a GaN semiconductor ultraviolet ray-emitting device is very useful industrially or environmentally. In addition, LED's (UV-LEDs) and LD's (UV-LDs) are smaller in size, longer in lifetime, higher in efficiency and lower in cost, and thus, attracting attention as a light source for radiation-curing inkjet printers.

In the invention, light-emitting diodes (LED) and laser diodes (LD) may be used as the source of active radiation. In particular, when a UV light source is needed, a UV-LED or a UV-LD may be used. For example, Nichia Corporation has marketed a violet LED having a wavelength of the main emission spectrum of between 365 nm and 420 nm. Further, when a shorter wavelength is needed, U.S. Pat. No. 6,084,250 discloses an LED capable of emitting active radiation whose wavelength is centered between 300 nm and 370 nm. Further, another UV LED is available, and irradiation can be carried out with radiation of a different UV bandwidth. The active radiation source particularly preferable in the invention is a UV-LED, and a UV-LED having a peak wavelength at 350 to 420 nm is particularly preferable.

The maximum illumination intensity of the LED on a recording medium is preferably 10 to 2,000 $mW/cm^2$, more preferably 20 to 1,000 $mW/cm^2$, and particularly preferably 50 to 800 $mJ/cm^2$.

In the invention, the ink composition is preferably exposed to the active radiation, for example, for 0.01 to 120 seconds, preferably, 0.1 to 90 seconds.

The irradiation condition and the basic irradiation method of the active radiation are disclosed in JP-A No. 60-132767. Specifically, the exposure is performed in a so-called shuttle process, i.e., by moving a head unit and light sources that are placed at both sides of the head unit in the ink-ejecting device. The active radiation is irradiated after a certain period (e.g., 0.01 to 0.5 second, preferably 0.01 to 0.3 second, and more preferably, 0.01 to 0.15 second) from ink ejection. It is possible to prevent bleeding of the ink ejected on the recording medium before curing by controlling the period from ink ejection to irradiation as short as possible. In this manner, it becomes possible to irradiate the ink before penetration into the depth to which no light is penetrable even on a porous recording medium, suppress the amount of unreacted residual monomer, and consequently reduce odor.

Alternatively, the ink may be hardened with a light from another fixed light source. WO 99/54415 Pamphlet discloses, as the irradiation method, a method of using optical fiber and a method of irradiating the recorded area with a collimated UV ray, i.e., a collimated light reflected from a mirror placed on the side face of head unit.

EXAMPLES

The present invention will be described below more concretely with reference to Examples and Comparative Examples. However, the invention is not limited to these examples.

[Image Formation Through Polymerization]

Preparation of Ink Composition

Example 1

Ink A1

A mixture of components as described below were filtrated with a filter having an opening diameter of 2 μm to give an ink composition. The ink composition had a viscosity of 10 mPa·s at the ejection temperature of the ink (45° C.).

| | |
|---|---|
| Phenoxyethyl acrylate | 36.0 parts by mass |
| ACTILANE 421 | 16.0 parts by mass |
| (acrylate monomer, manufactured by Akcros) | |
| n-Vinylcaprolactam | 18.0 parts by mass |
| SOLSPERSE 32000 | 0.4 part by mass |
| (dispersant, manufactured by Noveon) | |
| CINQUASIA MAZENTA RT-355D | 3.6 parts by mass |
| (pigment, manufactured by Ciba Specialty Chemicals) | |
| GENORAD 16 | 0.05 part by mass |
| (stabilizer, manufactured by Rahn) | |
| RAPI-CURE DVE-3 | 8.0 parts by mass |
| (vinyl ether, manufactured by ISP Europe) | |
| LUCIRIN TPO | 8.5 parts by mass |
| (photopolymerization initiator, manufactured by BASF) | |
| Benzophenone | 4.0 parts by mass |
| (photopolymerization initiator) | |
| IRGACURE 184 | 4.0 parts by mass |
| (photopolymerization initiator, manufactured by Ciba Specialty Chemicals) | |
| BYK 307 | 0.05 part by mass |
| (defoaming agent, manufactured by BYK Chemie) | |
| Fluorine-containing polyfunctional monomer | 0.9 part by mass |
| (compound a-1: compound represented by formula A-1 and having a methacryloyl group as $R^1$ in formula A-1) | |

Example 2

Ink A2

An ink composition was prepared in the same way as in Example 1, except for using compound a-2 (compound represented by formula A-2 and having a methacryloyl group as $R^1$ in formula A-2) instead of compound a-1 as a fluorine-containing polyfunctional monomer. The ink composition had a viscosity of 10 mPa·s at the ejection temperature of the ink (45° C.).

Example 3

Ink A3

An ink composition was prepared in the same way as in Example 1, except for using compound a-3 (compound represented by formula A-3 and having an acryloyl group as $R^1$ in formula A-3) instead of compound a-1 as a fluorine-containing polyfunctional monomer. The ink composition had a viscosity of 10 mPa·s at the ejection temperature of the ink (45° C.).

Example 4

Ink A4

An ink composition was prepared in the same way as in Example 1, except for using a compound a-4 (compound represented by formula A-4 and having an acryloyl group as $R^1$ in formula A-4) instead of compound a-1 as a fluorine-containing polyfunctional monomer. The ink composition had a viscosity of 10 mPa·s at the ejection temperature of the ink (45° C.).

Example 5

Ink A5

An ink composition was prepared in the same way as in Example 1, except for using compound a-5 (compound represented by formula A-5 and having an acryloyl group as $R^1$ in formula A-5) instead of compound a-1 as a fluorine-containing polyfunctional monomer. The ink composition had a viscosity of 10 mPa·s at the ejection temperature of the ink (45° C.).

Example 6

Ink A6

An ink composition was prepared in the same way as in Example 1, except for using compound a-6 (compound represented by formula A-6 and having a methacryloyl group as $R^1$ in formula A-6) instead of compound a-1 as a fluorine-containing polyfunctional monomer. The ink composition had a viscosity of 10 mPa·s at the ejection temperature of the ink (45° C.).

Example 7

Ink A7

An ink composition was prepared in the same way as in Example 1, except for using compound a-7 (compound represented by formula A-7 and having a methacryloyl group as $R^1$ in formula A-7) instead of compound a-1 as a fluorine-containing polyfunctional monomer. The ink composition had a viscosity of 10 mPa·s at the ejection temperature of the ink (45° C.).

Example 8

Ink A8

An ink composition was prepared in the same way as in Example 1, except for using compound a-8 (compound represented by formula A-8 and having an acryloyl group as $R^1$ in formula A-8) instead of compound a-1 as a fluorine-containing polyfunctional monomer. The ink composition had a viscosity of 10 mPa·s at the ejection temperature of the ink (45° C.).

Example 9

Ink A9

An ink composition was prepared in the same way as in Example 1, except for using compound a-9 (compound represented by formula A-9 and having an acryloyl group as $R^1$ in formula A-9, whose specific structure is shown below. Trade name: LINC-3A, manufactured by KYOEISHA CHEMICAL) instead of compound a-1 as a fluorine-containing polyfunctional monomer. The ink composition had a viscosity of 10 mPa·s at the ejection temperature of the ink (45° C.).

Example 10

Ink A10

An ink composition was prepared in the same way as in Example 1, except for using a compound a-10 (compound represented by formula A-10 and having an acryloyl group as $R^1$ in formula A-10, whose specific structure is shown below. Trade name: LINC-102A, manufactured by KYOEISHA CHEMICAL) instead of compound a-1 as a fluorine-containing polyfunctional monomer. The ink composition had a viscosity of 10 mPa·s at the ejection temperature of the ink (45° C.).

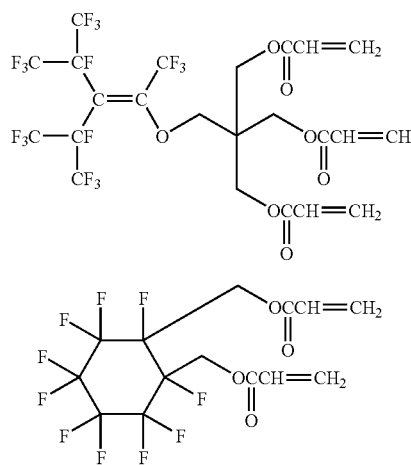

Comparative Example 1

Ink B1

An ink composition was prepared in the same way as in Example 1, except for not using a fluorine-containing polyfunctional monomer. The ink composition had a viscosity of 10 mPa·s at the ejection temperature of the ink (45° C.).

Comparative Example 2

Ink B2

An ink composition was prepared in the same way as in Example 1, except for using a polyfunctional monomer (compound B-1) as shown below instead of a fluorine-containing polyfunctional monomer. In compound B-1 below, $R^1$ is a methacryloyl group. The ink composition had a viscosity of 10 mPa·s at the ejection temperature of the ink (45° C.).

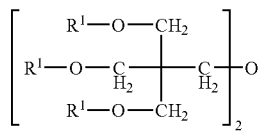

<<Inkjet Image Recording>>
(Evaluation of Image)

Next, recording onto a recording medium was performed with a commercially available inkjet recording apparatus having a piezoelectric inkjet nozzle. An ink-supplying system included a stock tank, a supply pipe, an ink-supplying tank disposed immediately before an inkjet head, a filter and a piezoelectric inkjet head, in which portion(s) from the ink-supplying tank to the inkjet head were insulated and heated. Temperature sensors were set to the ink-supplying tank and near the nozzle of the inkjet head, respectively, and used to control the temperature of the nozzle portion to be 70° C.±2° C. at any time. The piezoelectric inkjet head was so driven that multi-sized dots could be ejected in amounts of 8 to 30 pl at a definition of 720×720 dpi. An irradiation system, a main scanning velocity and an ejection frequency were controlled so that UV light was focused to give an irradiation surface illuminance of 100 mW/cm², and that the irradiation began 0.1 second after the deposition of the ink onto a recording medium. Irradiation time was variably set to irradiate exposure energy. Meanwhile, "dpi" in the invention represents the dot number per 2.54 cm.

Each of the above prepared ink composition was ejected at an ambient temperature of 25° C., and, while using NCCU033 manufactured by Nichia as a UV-LED, ultraviolet rays were irradiated for every ejected ink. The UV-LED outputs ultraviolet light having a wavelength of 365 nm from one chip, wherein the chip emits a light of about 100 mW by distributing a current of about 500 mA. Plural chips were aligned at intervals of 7 mm to give a power of 0.3 W/cm² on the surface of a recording medium (hereinafter, also referred to as a medium). The time from the ejecting the ink to the initiation of the irradiation, and the irradiation time were variable by controlling the conveying velocity of a medium and the interval between the head and the LED in the conveying direction. In the Examples and Comparative Examples, irradiation was performed about 0.5 second after the deposition of the ink.

In accordance with the setting of the distance to the medium and the conveying velocity, the irradiation energy on the medium may be adjusted between 0.01 and 15 J/cm². Meanwhile, the irradiation time was determined as a time period until which the image surface after ultraviolet ray irradiation had lost adhesion property. As the recording medium, a flexible polyvinyl chloride sheet was used.

Under the conditions, curing sensitivity, antiblocking property and abrasion resistance were evaluated. Results are shown in Table 1. Respective evaluation items in Table 1 were measured and evaluated as follows.

(Measurement of Curing Sensitivity)

An irradiation energy amount (mJ/cm²) that was given until the image surface after the ultraviolet ray irradiation did not show adhesion property was defined as curing sensitivity. A smaller value means a higher sensitivity.

(Evaluation of Antiblocking Property)

On a formed image after the ultraviolet ray irradiation, 500 sheets of PET (size: the same size as the flexible polyvinyl chloride sheet, on which the image had been formed, in both horizontal and vertical direction; weight: 2 g/sheet) were stacked and left to stand for one day, for which transfer to the PET was evaluated visually. When no transfer occurred, it was evaluated as being A. When the transfer occurred, it was evaluated as being B.

(Evaluation of Abrasion Resistance)

The flexible polyvinyl chloride sheet was rubbed with an eraser (K-50 Plastic Eraser Keep, manufactured by Hoshiya) to evaluate the transfer to the eraser. When no transfer occurred, it was evaluated as being A. When the transfer occurred, it was evaluated as being B.

TABLE 1

|  | Fluorine-containing polyfunctional monomer or polyfunctional monomer | Curing sensitivity (mJ/cm$^2$) | Antiblocking property | Abrasion resistance |
|---|---|---|---|---|
| Example 1 | a-1 | 300 | A | A |
| Example 2 | a-2 | 300 | A | A |
| Example 3 | a-3 | 300 | A | A |
| Example 4 | a-4 | 300 | A | A |
| Example 5 | a-5 | 300 | A | A |
| Example 6 | a-6 | 300 | A | A |
| Example 7 | a-7 | 300 | A | A |
| Example 8 | a-8 | 300 | A | A |
| Example 9 | a-9 | 300 | A | A |
| Example 10 | a-10 | 300 | A | A |
| Comparative Example 1 | none | 2300 | B | B |
| Comparative Example 2 | B-1 | 800 | B | B |

[Application for Ink for Embossing]

<<Inkjet Image Recording>>

For the evaluation, ink A1 prepared in Example 1, and ink B1 prepared in Comparative Example 2 were used and referred to as Example 11 and Comparative Example 3 respectively. Evaluation results are listed in Table 2.

Hereinafter, the evaluation method will be described.

The recording to the recording medium was performed using an inkjet recording experimental apparatus having a piezoelectric inkjet nozzle. An ink-supplying system included a stock tank, a supply pipe, an ink-supplying tank disposed immediately before an inkjet head, a filter and a piezoelectric inkjet head, in which portion(s) from the ink-supplying tank to the inkjet head were insulated and heated. Temperature sensors were set to the ink-supplying tank and near the nozzle of the inkjet head, respectively, and used to control the temperature of the nozzle portion to be 45° C.±2° C. at any time. The piezoelectric inkjet head was so driven that multi-sized dots could be ejected in amounts of 8 to 30 pl at a definition of 720×720 dpi. An irradiation system, a main scanning velocity and an ejection frequency were controlled so that UV light was focused to give an irradiation surface illuminance of 2,100 mW/cm$^2$, and the irradiation began 0.1 second after the deposition of the ink onto a recording medium. In addition, the irradiation to the image was controlled so that the accumulated irradiation amount might be 6,000 mJ/cm$^2$. As a ultraviolet ray lamp, HAN250NL high-cure mercury lamp (manufactured by GS Yuasa Corporation) was used. Meanwhile, "dpi" in the invention represents the dot number per 2.54 cm.

For the recording medium, HK31-WF (film thickness: 120 μm, PET, manufactured by HYNT) was used for an embossing test described below, and TEFLEX FT-3 (film thickness: 50 μm, PET, manufactured by Teijin DuPont) was used for a vacuum forming test. For each sample, an image was drawn so as to form an ink cured film having an average thickness of 12 μm.

<<Methods for Processing Evaluation>>

(Embossing Test)

Figure 1A:
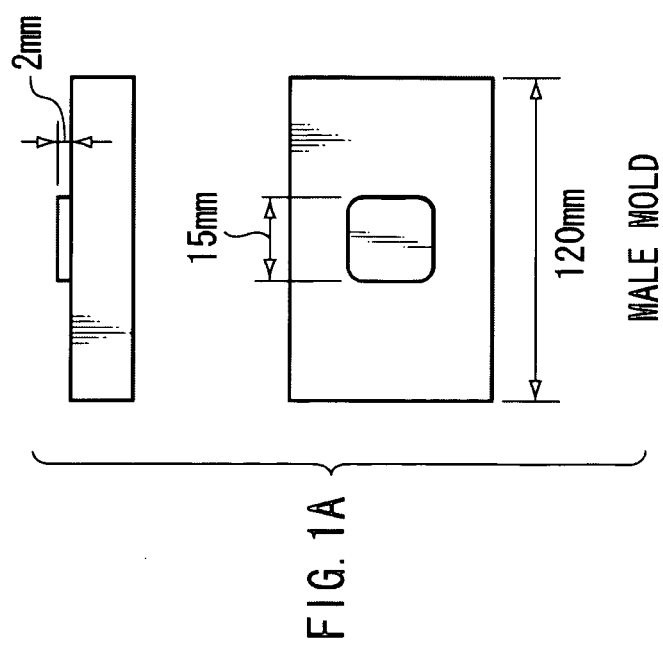
FIG. 1A is a side view and top view each illustrating the mold used in the embossing test in the Examples.

Under the conditions of 25° C., a printed material formed was sandwiched between a stainless steel male mold shown in FIG. 1A and a stainless steel female mold shown in FIG. 1B. The printed material was subjected to embossing by application of a load of 150 kg for 5 seconds using a press machine, MIZUHOA HANDPOWER (manufactured by Matsushita Electric Tools). In each of FIGS. 1A and 1B, the upper diagram is the mold viewed from the side, and the lower diagram is the mold viewed from the top. Whether cracks or white spots were formed in the embossed part of the image was visually observed. When neither a crack nor a white spot was formed, it was evaluated as being A. When a crack or a white spot was formed, it was evaluated as being B.

(Vacuum Forming Test)

Figure 2:
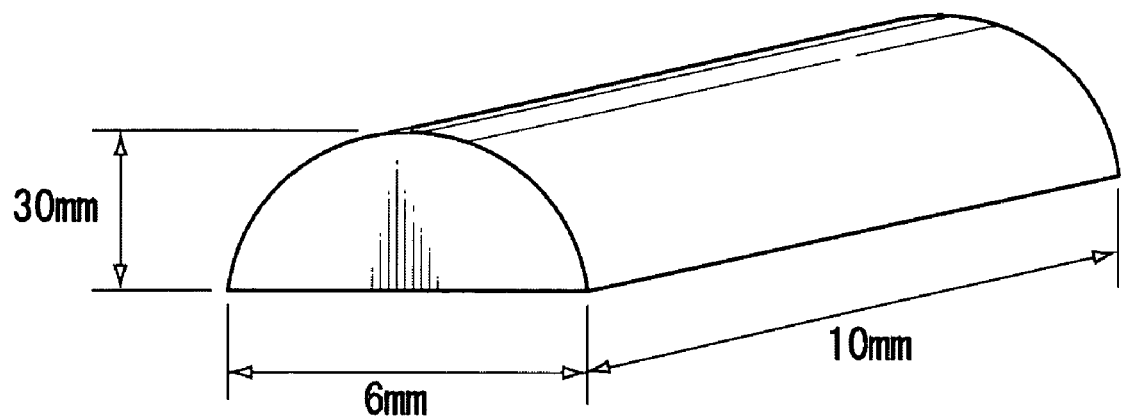
FIG. 2 is a perspective view illustrating the wood mold used in the vacuum forming test in the Examples.

Using a vacuum forming apparatus, FORMING 300X (manufactured by Seiko Sangyo), the temperature of the heater was set so as to give the support temperature of 90° C., and a wooden mold, shown in FIG. 2, was placed at the center of a vacuum table. Then, vacuum forming was performed. Whether cracks or white spots were formed in the formed printed material was visually observed. When neither a crack nor a white spot was formed, it was evaluated as being A. When a crack or a white spot was formed, it was evaluated as being B. Results are shown in Table 2.

TABLE 2

|  | Ink No. | Embossing | Vacuum forming |
|---|---|---|---|
| Example 11 | A1 | A | A |
| Comp Ex 3 | B1 | B | B |

From Tables 1 and 2, it is understood that the ink composition according to the invention, which contains a monomer containing a fluorinated alkylene group and two or more polymerizable groups in the molecule, has both good anti-blocking property and abrasion resistance. Further, it is understood that neither a crack nor a white spot is formed when it is subjected to embossing or vacuum forming. In contrast, for the ink compositions of Comparative Examples that do not contain a fluorine-containing polyfunctional monomer, or that employs another monomer instead of it, both evaluation showed poor results.

According to the invention, it is possible to form an image excellent in abrasion resistance, antiblocking property and flexibility, and to provide an ink composition for inkjet recording having a low viscosity and an inkjet recording method employing the ink composition.

In addition, it is possible to provide a printed material obtained by using the ink composition.

Hereinafter exemplary embodiments of the present invention will be described. However, the present invention is not limited to the following exemplary embodiments.

<1> An ink composition for inkjet recording, comprising:
a monomer containing a fluorinated alkylene group and two or more polymerizable groups,
a photo initiator, and
a polymerizable monomer.

<2> The ink composition for inkjet recording according to <1>, wherein the monomer containing a fluorinated alkylene group and two or more polymerizable groups is at least one selected from the group consisting of:
  a monomer containing a chain structure containing a fluorinated alkylene group, and two or more polymerizable groups respectively provided at two or more terminals of the chain structure; and
  a monomer containing a ring structure having two or more chain-shaped substituents and containing a fluorinated alkylene group, and two or more polymerizable groups respectively provided at a terminal of two or more chain-shaped substituents of the two or more chain-shaped substituents.

<3> The ink composition for inkjet recording according to <1> or <2>, wherein the two or more polymerizable groups of the monomer are radically polymerizable.

<4> The ink composition for inkjet recording according to <1> or <2>, wherein the two or more polymerizable groups of the monomer are cationically polymerizable.

<5> The ink composition for inkjet recording according to any one of <1> to <4>, wherein the polymerizable monomer is a radically polymerizable monomer, and the content of the radically polymerizable monomer is 60 mass % or more relative to the total solid content of the ink composition for inkjet recording.

<6> An inkjet recording method comprising:
  ejecting the ink composition for inkjet recording of <1> onto a recording medium using an inkjet recording apparatus; and
  irradiating the ejected ink composition with active radiation to cure the ink composition for inkjet recording.

<7> The inkjet recording method according to <6>, wherein the monomer containing a fluorinated alkylene group and two or more polymerizable groups is at least one selected from the group consisting of:
  a monomer containing a chain structure containing a fluorinated alkylene group, and two or more polymerizable groups respectively provided at two or more terminals of the chain structure, and
  a monomer containing a ring structure having two or more chain-shaped substituents and containing a fluorinated alkylene group, and two or more polymerizable groups respectively provided at a terminal of two or more chain-shaped substituents of the two or more chain-shaped substituents.

<8> The inkjet recording method according to <6> or <7>, wherein the two or more polymerizable groups of the monomer are radically polymerizable.

<9> The inkjet recording method according to <6> or <7>, wherein the two or more polymerizable groups of the monomer are cationically polymerizable.

<10> The inkjet recording method according to any one of <6> to <9>, wherein the polymerizable monomer is a radically polymerizable monomer, and the content of the radically polymerizable monomer is 60 mass % or more relative to the total solid content of the ink composition for inkjet recording.

<11> A printed material recorded by the inkjet recording method according to any one of <6> to <10>.

All publications, patent applications, and technical standards mentioned in this specification were herein incorporated by reference to the same extent as if each individual publication, patent application, or technical standard was specifically and individually indicated to be incorporated by reference.

What is claimed is:

1. An ink composition for inkjet recording, comprising:
  a monomer containing a fluorinated alkylene group and two or more polymerizable groups, each of the two or more polymerizable groups being independently selected from the group consisting of an acrylic acid ester group, a methacrylic acid ester group, an itaconic acid ester group, a crotonic acid ester group, an isocrotonic acid ester group, a maleic acid ester group, and a styrene group;
  a photo initiator; and
  a polymerizable monomer that is provided in addition to the monomer containing a fluorinated alkylene group and two or more polymerizable groups;
  wherein the monomer containing a fluorinated alkylene group and two or more polymerizable groups is at least one selected from the group consisting of:
  (i) a monomer including a chain structure containing a fluorinated alkylene group, the monomer being represented by the following formula (2), and
  (ii) a monomer containing a ring structure having two or more chain-shaped substituents and containing a fluorinated alkylene group, and having two or more polymerizable groups respectively provided at terminals of at least two of the two or more chain-shaped substituents:

$$B\text{-}(L^2\text{-}X)_{n1} \qquad \text{Formula (2)}$$

wherein in formula (2), L represents a fluorinated alkylene group, X represents a polymerizable group, B represents a branched group having three or more bonds, and n1 is an integer of 3 or more.

2. The ink composition for inkjet recording according to claim 1, wherein the polymerizable monomer that is provided in addition to the monomer containing a fluorinated alkylene group and two or more polymerizable groups is a radically polymerizable monomer, and the content of the radically polymerizable monomer is 60 mass % or more relative to the total solid content of the ink composition for inkjet recording.

3. An inkjet recording method comprising:
  ejecting the ink composition for inkjet recording of claim 1 onto a recording medium using an inkjet recording apparatus; and
  irradiating the ejected ink composition with active radiation to cure the ink composition for inkjet recording.

4. The inkjet recording method according to claim 3, wherein the polymerizable monomer that is provided in addition to the monomer containing a fluorinated alkylene group and two or more polymerizable groups is a radically polymerizable monomer, and the content of the radically polymerizable monomer is 60 mass % or more relative to the total solid content of the ink composition for inkjet recording.

5. A printed material recorded by the inkjet recording method according to claim 3.

6. The ink composition for inkjet recording according to claim 1, wherein the monomer containing a fluorinated alkylene group and two or more polymerizable groups is at least one selected from the group consisting of compounds of the following formulae A-1 to A-4 and A-7 to A-10:

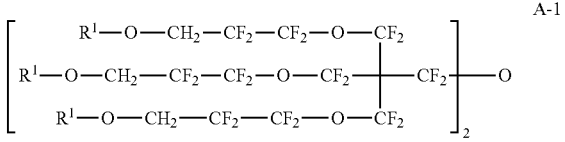

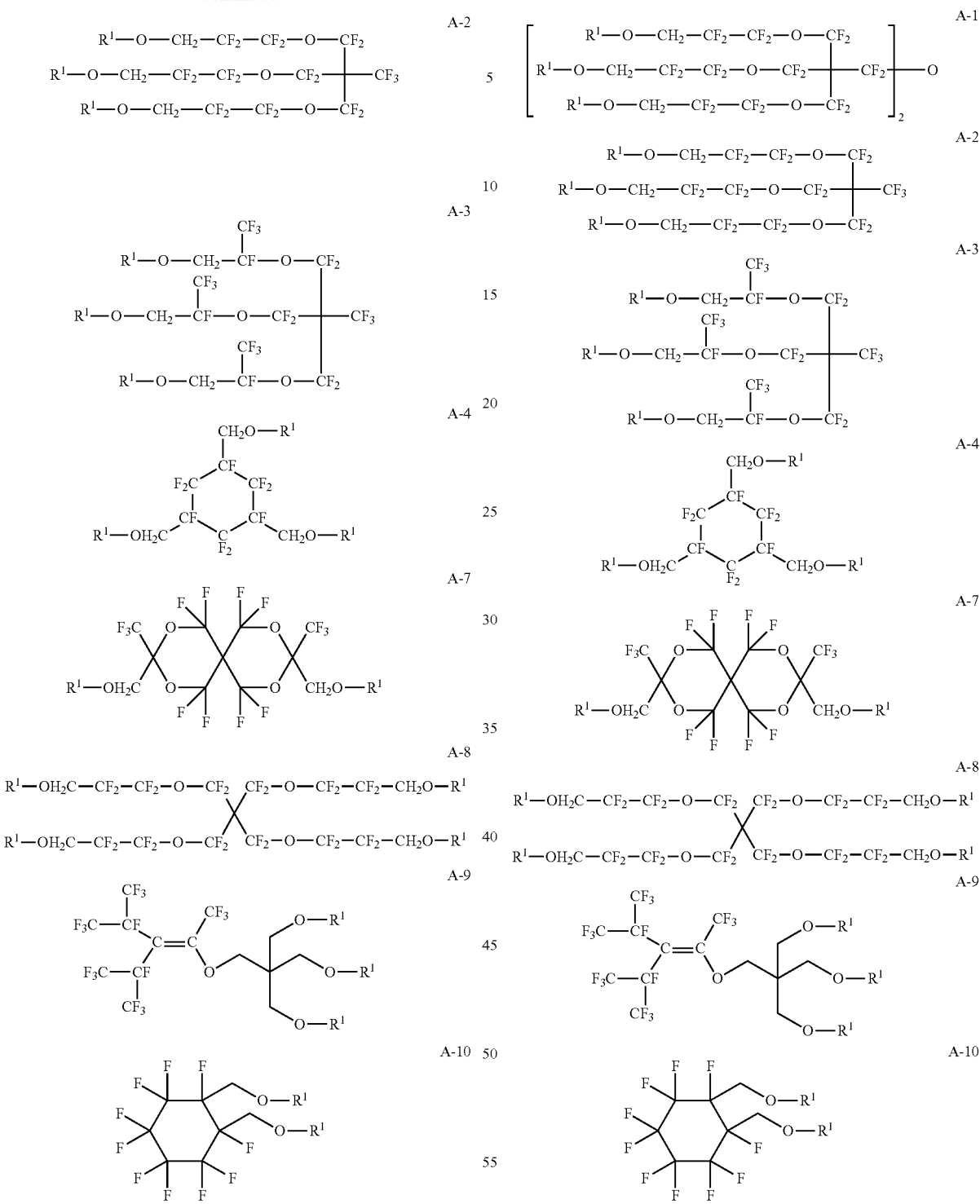

wherein, in formulae A-1 to A-4 and A-7 to A-10, each R¹ independently represents $CH_2=CH-(C=O)-$ or $CH_3-CH=CH-(C=O)-$.

7. The inkjet recording method according to claim 3, wherein the monomer containing a fluorinated alkylene group and two or more polymerizable groups is at least one selected from the group consisting of compounds of the following formulae A-1 to A-4 and A-7 to A-10:

wherein, in formulae A-1 to A-4 and A-7 to A-10, each R¹ independently represents $CH_2=CH-(C=O)-$ or $CH_3-CH=CH-(C=O)-$.

8. The printed material according to claim 5, wherein the monomer containing a fluorinated alkylene group and two or more polymerizable groups is at least one selected from the group consisting of compounds of the following formulae A-1 to A-4 and A-7 to A-10:

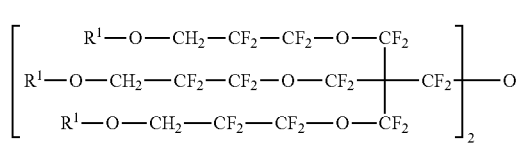
A-1
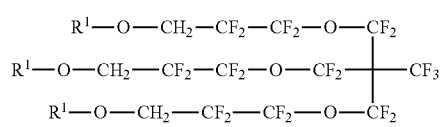
A-2
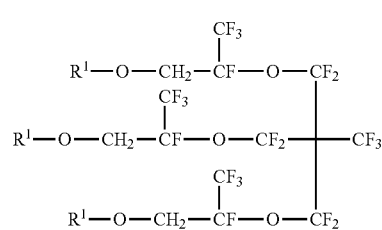
A-3
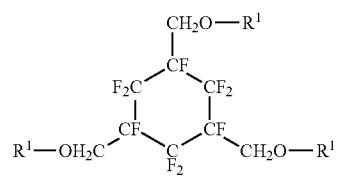
A-4
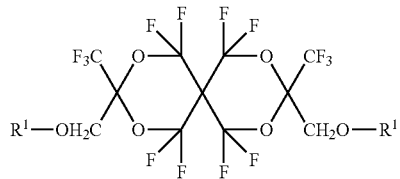
A-7
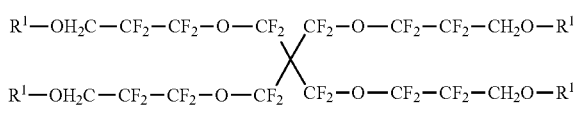
A-8
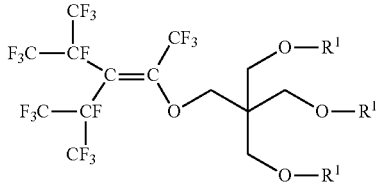
A-9
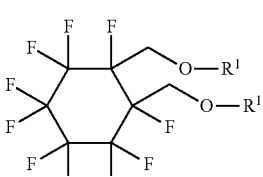
A-10
wherein, in formulae A-1 to A-4 and A-7 to A-10, each $R^1$ independently represents $CH_2=CH-(C=O)-$ or $CH_3-CH=CH-(C=O)-$.
* * * * *